United States Patent
Kim et al.

(10) Patent No.: US 12,445,545 B2
(45) Date of Patent: Oct. 14, 2025

(54) ELECTRONIC DEVICE INCLUDING WATERPROOF MEMBER

(71) Applicant: SAMSUNG ELECTRONICS CO., LTD., Suwon-si (KR)

(72) Inventors: Kyungpil Kim, Suwon-si (KR); Yitae Kang, Suwon-si (KR); Daeyoung Noh, Suwon-si (KR); Sungjin Lee, Suwon-si (KR); Sukwon Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 539 days.

(21) Appl. No.: 17/862,719

(22) Filed: Jul. 12, 2022

(65) Prior Publication Data
US 2023/0098942 A1 Mar. 30, 2023

Related U.S. Application Data

(63) Continuation of application No. PCT/KR2022/007119, filed on May 18, 2022.

(30) Foreign Application Priority Data

Sep. 24, 2021 (KR) .................. 10-2021-0126240

(51) Int. Cl.
*H04M 1/02* (2006.01)
*G06F 1/16* (2006.01)
*H01R 13/52* (2006.01)

(52) U.S. Cl.
CPC ........ *H04M 1/0249* (2013.01); *G06F 1/1656* (2013.01); *G06F 1/1675* (2013.01); *H01R 13/5202* (2013.01)

(58) Field of Classification Search
CPC .. H04M 1/0249; G06F 1/1656; G06F 1/1675; H01R 13/5202
See application file for complete search history.

(56) References Cited

U.S. PATENT DOCUMENTS

2012/0195013 A1 8/2012 Trzaskos et al.
2015/0155651 A1 6/2015 Ejiri
(Continued)

FOREIGN PATENT DOCUMENTS

CN 106027088 A 10/2016
CN 211352186 U 8/2020
(Continued)

OTHER PUBLICATIONS

International Search Report (PCT/ISA/210) issued Aug. 26, 2022 by the International Searching Authority in International Patent Application No. PCT/KR2022/007119.
(Continued)

*Primary Examiner* — Rafael Perez-Gutierrez
*Assistant Examiner* — Gilbert M. Grant
(74) *Attorney, Agent, or Firm* — Sughrue Mion, PLLC

(57) ABSTRACT

An electronic device includes a housing including a side wall having a first opening and a second opening provided at one side of the first opening; a tray configured to be inserted into or extracted from the housing through the first opening; and a waterproof member provided in the second opening and configured to reciprocate linearly, wherein the waterproof member includes: a pin member configured to linearly reciprocate within the second opening; and at least one waterproof ring protruding from an outer peripheral surface of the pin member and sealing a space between the outer peripheral surface of the pin member and an inner wall of the second opening, and wherein the second opening extends at an incline with respect to a direction in which the tray is inserted or extracted.

20 Claims, 14 Drawing Sheets

(56) References Cited

U.S. PATENT DOCUMENTS

| | | | |
|---|---|---|---|
| 2017/0108897 A1 | 4/2017 | Choi et al. | |
| 2018/0248987 A1* | 8/2018 | Cha | H01R 13/5213 |
| 2018/0321711 A1 | 11/2018 | Choi et al. | |
| 2020/0154585 A1 | 5/2020 | Chen et al. | |
| 2021/0042478 A1 | 2/2021 | Heo et al. | |
| 2021/0167487 A1* | 6/2021 | Varma | H01Q 1/243 |

FOREIGN PATENT DOCUMENTS

| | | | |
|---|---|---|---|
| JP | 2015-106554 A | 6/2015 | |
| JP | 2016-31887 A | 3/2016 | |
| JP | 2016-189103 A | 11/2016 | |
| KR | 10-2017-0045054 A | 4/2017 | |
| KR | 10-2018-0098037 A | 9/2018 | |
| KR | 10-2020-0017446 A | 2/2020 | |
| KR | 10-2021-0017409 A | 2/2021 | |
| KR | 10-2021-0018403 A | 2/2021 | |
| KR | 10-2021-0069598 A | 6/2021 | |

OTHER PUBLICATIONS

Written Opinion (PCT/ISA/237) issued Aug. 26, 2022 by the International Searching Authority in International Patent Application No. PCT/KR2022/007119.

Communication dated Aug. 20, 2024, issued by European Patent Office in European Patent Application No. 22873059.4.

Communication dated Jun. 18, 2025, issued by the Korean Intellectual Property Office in Korean Application No. 10-2021-0126240.

* cited by examiner

ELECTRONIC DEVICE INCLUDING WATERPROOF MEMBER

CROSS-REFERENCE TO RELATED APPLICATIONS

This application is a continuation application of International Application No. PCT/KR2022/007119, filed on May 18, 2022, which claims priority to Korean Patent Application No. 10-2021-0126240, filed on Sep. 24, 2021, in the Korean Intellectual Property Office, the disclosures of which are incorporated by reference herein in their entireties.

BACKGROUND

1. Field

Example embodiments of the present disclosure relates to an electronic device including a waterproof member.

2. Description of Related Art

Typically, an electronic device may refer to a device that performs a specific function according to a program provided therein (e.g., an electronic scheduler, a portable multimedia reproducer, a mobile communication terminal, a tablet personal computer (PC), an image/sound device, a desktop/laptop PC, or a vehicle navigation system), as well as a home appliance. The above-mentioned electronic devices may output, for example, information stored therein as sound or an image. As the degree of integration of electronic devices has increased and ultra-high-speed and large-capacity wireless communication has become popular, multiple functions have recently come to be provided in a single electronic device, such as a mobile communication terminal. For example, various functions, including an entertainment function such as gameplay, a multimedia function such as music/video playback, a communication and security function for mobile banking or the like, and/or a schedule management or e-wallet function, are integrated in a single electronic device, in addition to a communication function.

As the use of electronic devices such as mobile communication terminals and smartphones becomes commonplace, electronic devices are being further reduced in size and weight and may be exposed to various use environments. For example, an electronic device may be exposed to a sudden temperature change due to a user's movement in an environment with a large indoor/outdoor temperature difference, and exposure to a high humidity environment or moisture may cause a malfunction or failure in the electronic device. As one of the methods of suppressing the influence of the use environment, the electronic device may be equipped with a waterproof structure. For example, the electronic device may be provided with a waterproof structure to prevent moisture from contaminating the inside of the electronic device.

The above-described information may be provided as background for the purpose of helping understanding of the disclosure of this document. No claim or determination is made as to whether any of the foregoing may be applied as prior art regarding the disclosure of this document.

The external appearance of an electronic device may include various routes connected to or visually exposed to the external space, such as a connector hole for wired connection with an external device, a connection hole (or an operation hole) for mounting/removing a storage medium, and a sound hole for sound input/output. In addition, the electronic device may include various components visually exposed to an external space, such as an optical window or a mechanically operated button. These routes or components visually exposed to the outside may have different shapes and sizes, and may be designed, manufactured, or arranged to match the external appearance of the electronic device. In a shape or arrangement in consideration of the external appearance of the electronic device, an appropriate distance may not be secured between routes or components, which may cause deterioration of rigidity of the electronic device. Although various holes or buttons are arranged adjacent to each other, when sufficient rigidity is not ensured therebetween, there may be a difficulty in implementing a waterproof structure. For example, there may be a limit in making a design beautiful while securing mechanical rigidity or waterproof performance of the electronic device.

Various embodiments disclosed herein may solve the above-described problems and/or disadvantages and may provide at least the advantages described below, and may provide an electronic device in which stability and/or mechanical rigidity of a mechanical operation structure are ensured.

SUMMARY

Provided is an electronic device in which a waterproof structure is implemented while the stability of a mechanical operation structure is ensured.

Further, provided is an electronic device having an attractive appearance while implementing the stable mechanical operation structure and/or the waterproof structure.

Additional aspects will be set forth in part in the description which follows and, in part, will be apparent from the description, or may be learned by practice of the presented embodiments.

According to an aspect of the disclosure, an electronic device includes: a housing including a side wall having a first opening and a second opening provided at one side of the first opening; a tray configured to be inserted into or extracted from the housing through the first opening; and a waterproof member provided in the second opening and configured to reciprocate linearly, wherein the waterproof member includes: a pin member configured to linearly reciprocate within the second opening; and at least one waterproof ring protruding from an outer peripheral surface of the pin member and sealing a space between the outer peripheral surface of the pin member and an inner wall of the second opening, and wherein the second opening extends at an incline with respect to a direction in which the tray is inserted or extracted.

The pin member may include a central portion extending in one direction and at least partially disposed within the second opening, and a first working end located at a first end of the central portion and disposed within the second opening to be directed to an external space of the housing, wherein the at least one waterproof ring is provided on an outer peripheral surface of the central portion, and wherein the first working end has a cross-sectional diameter that is greater than a cross-sectional diameter of the central portion or has a cross-sectional diagonal length that is greater than a cross-sectional length of the central portion.

A plurality of waterproof rings may be sequentially disposed along a direction in which the central portion extends.

The pin member may further include a second working end located at a second end of the central portion, the second working end disposed in an internal space of the housing, and the second working end may have a cross-sectional diameter that is greater than the cross-sectional diameter of the central portion or has a cross-sectional diagonal length that is greater than the cross-sectional diagonal length of the central portion.

The pin member may further include at least three support protrusions protruding from an outer peripheral surface of the first working end, and the at least three support protrusions may be provided at equiangular intervals along a peripheral direction of the first working end or a circumferential direction of the first working end.

The pin member may be configured to linearly reciprocate within the second opening in response to an external force applied thereto, and at least one of the at least three support protrusions may be configured to selectively contact the inner wall of the second opening when the pin member linearly reciprocates.

The electronic device may further include: a circuit board disposed in the housing; and a rib extending from an inner surface of the side wall and surrounding at least a portion of the second opening inside the housing, wherein the rib is at least partially disposed between the circuit board and the second opening.

A thickness of the rib may gradually decrease toward an exterior of the housing.

The electronic device may further include: a socket provided on the circuit board and aligned with the first opening; and a release lever provided on one side of the socket, the release lever being configured to linearly reciprocate with the second opening and aligned with the second opening, wherein the tray may be at least partially accommodated in the socket within the housing, and wherein the tray may be configured to move the release lever while the pin member linearly reciprocates within the second opening in response to an external force applied thereto.

The pin member may further include a central portion extending in one direction and at least partially disposed within the second opening, and a first working end located at a first end of the central portion and disposed within the second opening to be directed to an external space of the housing, wherein the at least one waterproof ring may be provided on an outer peripheral surface of the central portion, and wherein the first working end may have a cross-sectional diameter that is greater than a cross-sectional diameter of the central portion or has cross-sectional diagonal length that is greater than a cross-sectional length of the central portion.

The pin member may further include at least three support protrusions protruding from the outer peripheral surface of the first working end, and the at least three support protrusions may be provided at equiangular intervals along a peripheral direction of the first working end or a circumferential direction of the first working end.

The pin member may be further configured to linearly reciprocate within the second opening in response to an external force, and at least one of the at least three support protrusions may be configured to selectively contact the inner wall of the second opening when the pin member linearly reciprocates.

The housing may include a first surface and a second surface facing away from the first surface, wherein the side wall may surround a space between the first surface and the second surface, the second opening may be parallel to a direction in which the tray is inserted or extracted when viewed from a direction perpendicular to the first surface, and the second may be inclined with respect to the direction in which the tray is inserted or extracted when viewed from a direction parallel to the first surface.

The at least one waterproof ring may include, at an upper end thereof, at least one dummy groove provided along a peripheral direction of the pin member or a circumferential direction of the pin member, and the at least one waterproof ring may be configured to contact the inner wall of the second opening along at least two closed loop trajectories.

The waterproof member may further include a stopper provided at one end of the pin member and configured to selectively contact an inner surface of the side wall around the second opening.

According to an aspect of the disclosure, an electronic device includes: a housing including a side wall having a first opening and a second opening at one side of the first opening; a tray configured to be inserted into or extracted from the housing through the first opening; and a waterproof member provided in the second opening and configured to reciprocate linearly, wherein the waterproof member includes: a pin member configured to linearly reciprocate within the second opening; and a waterproof ring provided on an outer peripheral surface of the pin member, the waterproof ring including: a coupling portion at least partially surrounding the outer peripheral surface of the pin member, at least one sealing portion protruding from an outer peripheral surface of the coupling portion and contacting an inner wall of the second opening, and at least three support portions protruding from the outer peripheral surface of the coupling portion and extending in a direction away from the at least one sealing portion, wherein the at least one sealing portion is configured to seal a space between the outer peripheral surface of the pin member and the inner wall of the second opening, and wherein the second opening extends at an incline with respect to a direction in which the tray is inserted or extracted.

The at least three support portions may include: at least three first support portions provided closer to an external space of the housing than the at least one sealing portion; and at least three second support portions provided closer to an internal space of the housing than the at least one sealing portion.

The pin member may be further configured to linearly reciprocate within the second opening in response to an external force, and at least one of the at least three support portions may be configured to selectively contact the inner wall of the second opening when the pin member linearly reciprocates.

The at least one sealing portion may protrude from the outer peripheral surface of the coupling portion by a first height, and the at least three support portions may protrude by a second height that is lower than the first height.

The electronic device may further include: a circuit board provided in the housing; and a rib extending from an inner surface of the side wall and surrounding at least a portion of the second opening inside the housing, and the rib may be at least partially disposed between the circuit board and the second opening and has a thickness that gradually decreases towards an exterior of the housing.

According to various embodiments disclosed herein, the second opening is provided to be inclined with respect to the insertion direction of the tray while accommodating the pin member to provide a tray separation function. Thus, it may be easy to secure the thickness of a mechanical structure (e.g., a rib) inside the electronic device. For example, it is possible to provide a stable structure or sufficient mechanical rigidity for the operation of the pin member. In an embodiment, since the second opening is provided to be inclined with respect to the insertion direction of the tray, the second opening may be easily aligned with another hole or a button in the external appearance of the electronic device. Various embodiments disclosed herein may improve flexibility in design and make the external appearance of an electronic device beautiful. In some embodiments, the rib provided inside the electronic device (e.g., housing) provides a sufficient section or distance for the pin member to linearly reciprocate. Therefore, it is possible to provide a stable operating structure for the pin member in implementing a tray separation function.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description made with reference to the appended drawings is provided in order to help comprehensive understanding of the various implementations of the disclosure defined by the claims and their equivalents. A specific embodiment disclosed in the following description includes various specific details to help understanding, but is considered to be one of various embodiments. Accordingly, it will be apparent to those skilled in the art that various changes and modifications of the various implementations described herein can be made without departing from the scope and spirit of the disclosure. In addition, descriptions of well-known functions and configurations may be omitted for clarity and brevity.

The terms and words used in the following description and claims are not limited to a bibliographical meaning, but may be used to clearly and consistently describe the various embodiments disclosed herein. Therefore, it will be obvious to those skilled in the art that the following description of various implementations of the disclosure is provided only for the purpose of explanation, not for the purpose of limiting the disclosure defined as the scope of rights and equivalents thereto.

It should be understood that the singular forms of "a", "an", and "the" contain plural meanings, unless the context clearly indicates otherwise. Thus, for example, "a component surface" may mean including one or more component surfaces.

Figure 1:
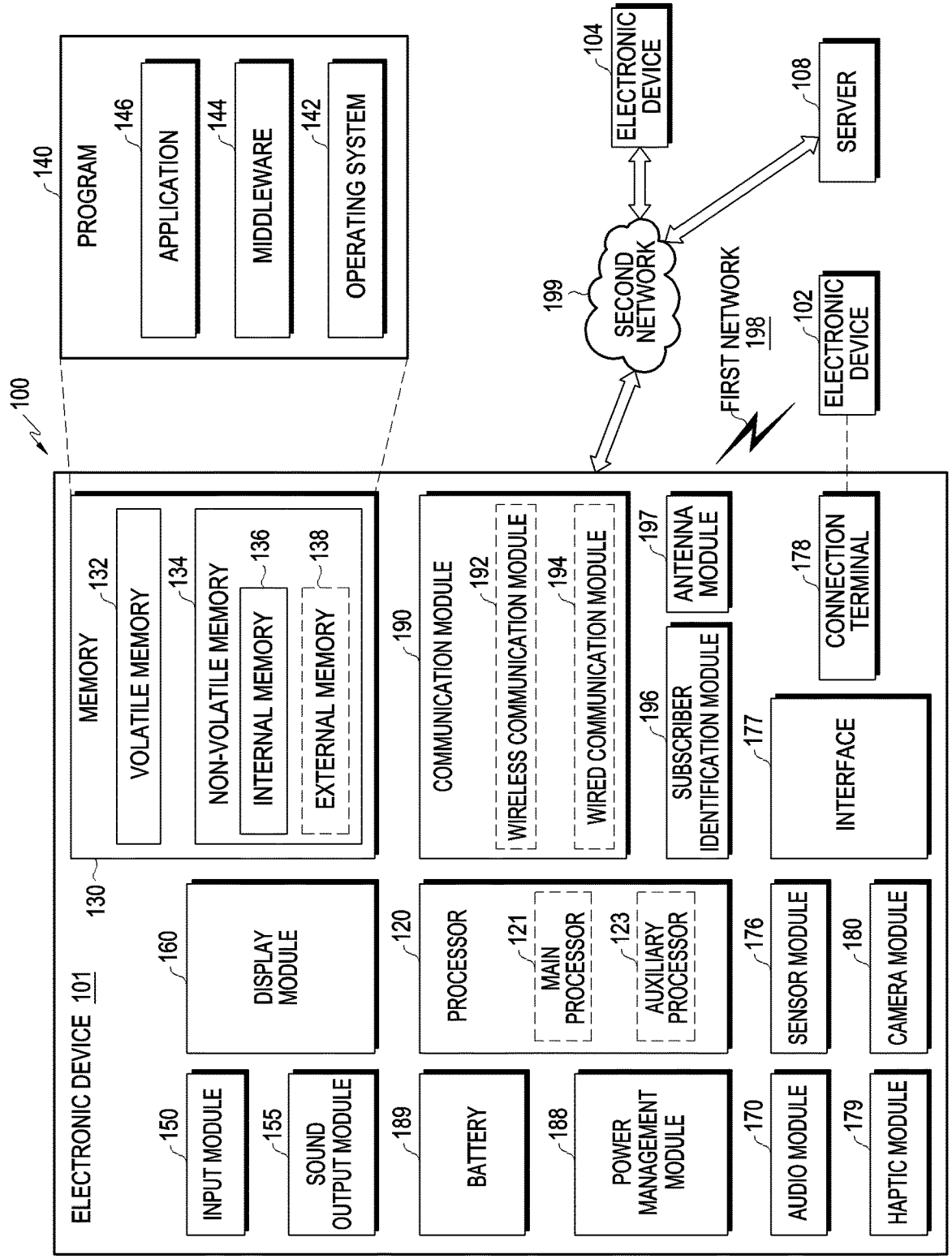
FIG. 1 is a block diagram illustrating an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of external devices. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed description, a longitudinal direction, a width direction, and/or a thickness direction of an electronic device may be referred to, wherein the longitudinal direction may be referred to as the "Y-axis direction", the width direction may be referred to as the "X-axis direction", and/or the thickness direction may be referred to as the "Z-axis direction". In some embodiments, "negative/positive (−/+)" may be referred to together with the Cartesian coordinate system illustrated in the drawings regarding the direction in which a component is oriented. For example, the front surface of an electronic device or a housing may be referred to as a "surface oriented in the +Z direction", and the rear surface may be defined as a "surface oriented in the −Z direction". In some embodiments, a side surface of an electronic device or a housing may include an area oriented in the +X direction, an area oriented in the +Y direction, an area oriented in the −X direction, and/or an area oriented in the −Y direction. In another embodiment, the "X-axis direction" may include both the "−X direction" and the "+X direction". It is noted that these are exemplified based on the Cartesian coordinate system illustrated in the drawings for the sake of brevity of description, and the description of these directions or components does not limit the various embodiments disclosed herein.

Figure 2:
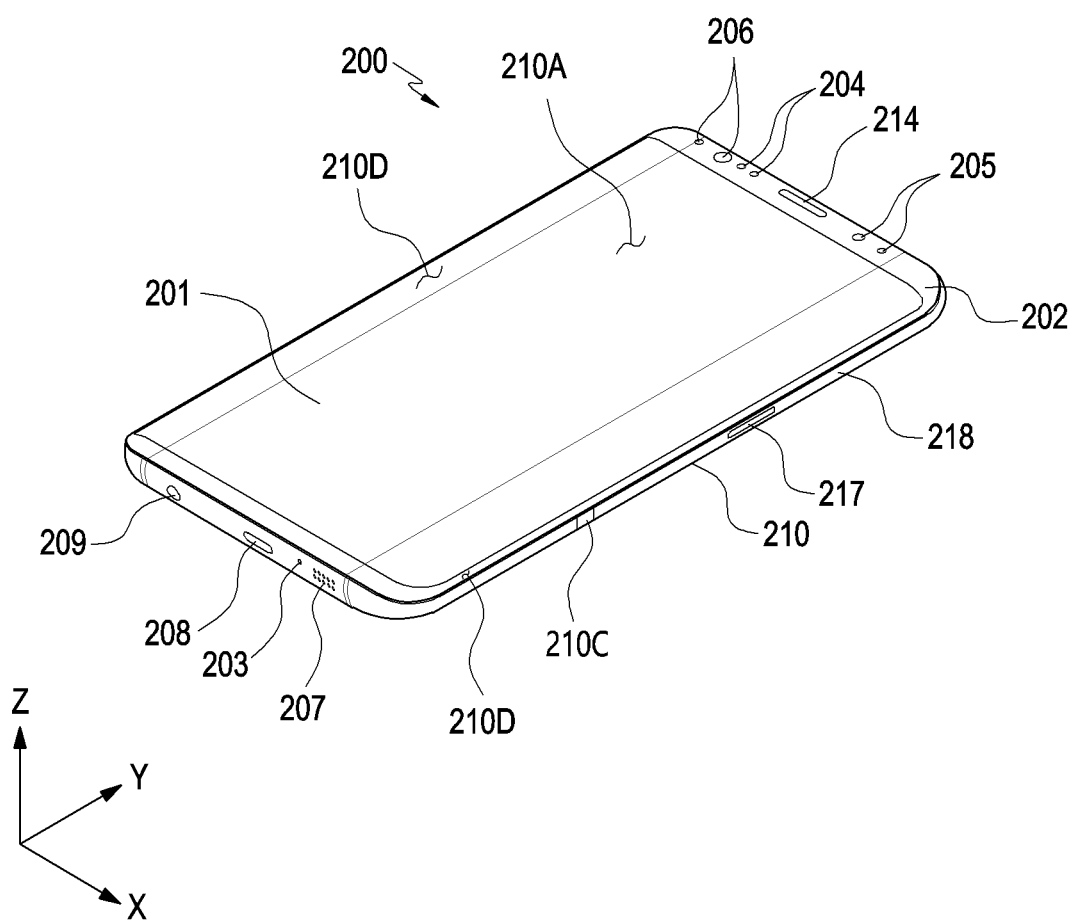
FIG. 2 is a diagram illustrating the front surface of the electronic device according to various embodiments.
Figure 3:
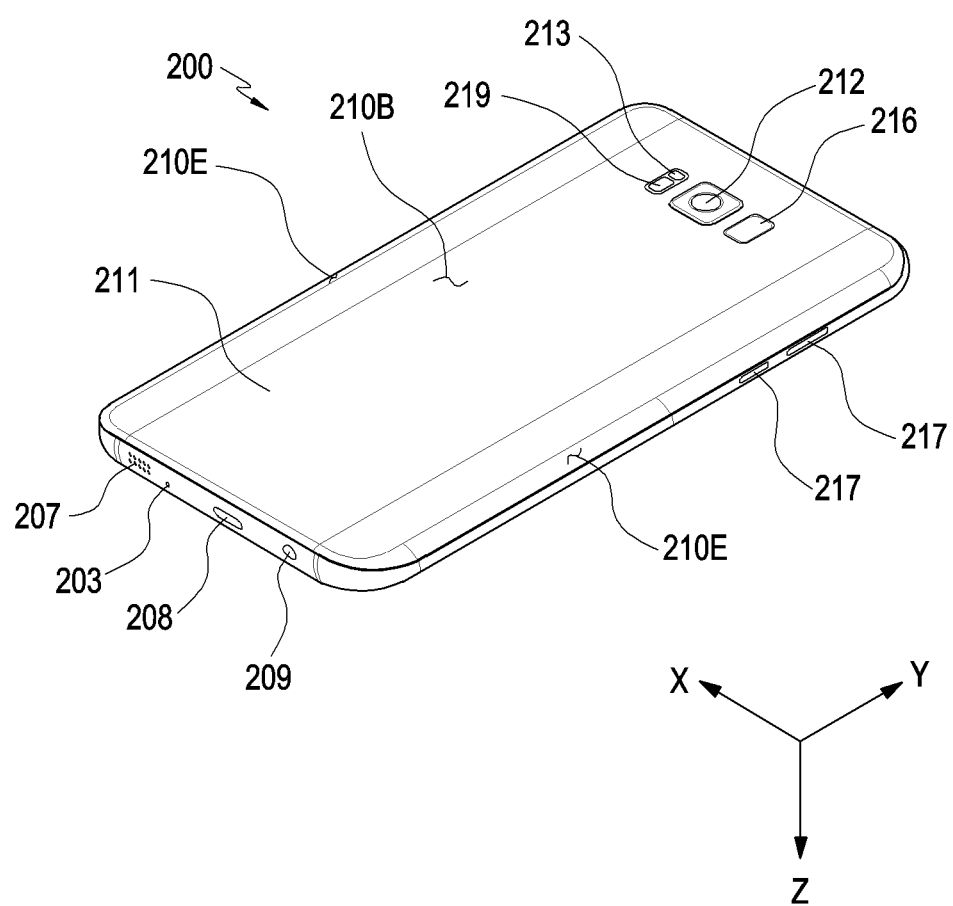
FIG. 3 is a diagram illustrating the rear surface of the electronic device illustrated in FIG. 2, according to various embodiments.

FIG. 2 is a diagram illustrating the front surface of the electronic device according to various embodiments. FIG. 3 is a diagram illustrating the rear surface of the electronic device illustrated in FIG. 2, according to various embodiments.

Referring to FIGS. 2 and 3, an electronic device 200 according to an embodiment may include a housing 210 including a first surface (or a front surface) 210A, a second surface (or a rear surface) 210B, and a side surface 210C surrounding the space between the first surface 210A and the second surface 210B. In another embodiment, the term "housing" may refer to a structure forming some of the first surface 210A, the second surface 210B, and the side surface 210C of FIG. 2. According to an embodiment, at least a portion of the first surface 210A may be defined by a substantially transparent front plate 202 (e.g., a glass plate or a polymer plate including various coating layers). The second surface 210B may be defined by a substantially opaque rear plate 211. The rear plate 211 may be made of, for example, coated or colored glass, ceramic, polymer, metal (e.g., aluminum, stainless steel (STS), or magnesium), or a combination of two or more of these materials. The side surface 210C may be defined by a side structure 218 coupled to the front plate 202 and the rear plate 211 and including a metal and/or a polymer. In some embodiments, the rear plate 211 and the side structure 218 may be configured integrally with each other, and may include the same material (e.g., a metal material such as aluminum).

As shown in FIG. 2, the front plate 202 may include two first areas 210D, which are bent or curved from the first surface 210A toward the rear plate 211 and extend seamlessly, at the opposite long edges thereof. As shown in FIG. 3, the rear plate 211 may include, at the opposite long edges thereof, two second areas 210E, which are bent or curved from the second surface 210B toward the front plate 202 and extend seamlessly. In some embodiments, the front plate 202 (or the rear plate 211) may include only one of the first areas 210D (or the second areas 210E). In another embodiment, some of the first areas 210D or the second areas 210E may not be included. In the above-described embodiments, when viewed from a side of the electronic device 200, the side structure 218 may have a first thickness (or width) at the area at which the first areas 210D or the second areas 210E are not included, and may have a second thickness, which is less than the first thickness, at the area at which the first areas 210D or the second areas 210E are included.

According to an embodiment, the electronic device 200 may include at least one of a display 201, audio modules 203, 207, and 214, sensor modules 204, 216, and 219, camera modules 205, 212, and 213, key input devices 217, light-emitting elements 206, and connector holes 208 and 209. In some embodiments, at least one of the components (e.g., the key input devices 217 or the light-emitting elements 206) may be omitted from the electronic device 200, or other components may be additionally included in the electronic device 200.

The display 201 may be exposed through, for example, a considerable portion of the front plate 202. In some embodiments, at least a portion of the display 201 may be exposed through the front plate 202 defining the first surface 210A and the first areas 210D of the side surface 210C. In some embodiments, the edges of the display 201 may be configured to be substantially the same as the shape of the periphery of the front plate 202 adjacent thereto. In another embodiment, the distance between the periphery of the display 201 and the periphery of the front plate 202 may be substantially constant in order to increase the exposed area of the display 201.

In another embodiment, recesses or openings may be provided in a portion of the screen display area of the display 201, and one or more of the audio module 214, the sensor modules 204, the camera modules 205, and the light-emitting elements 206, which are aligned with the recesses or the openings, may be included. In another embodiment, the rear surface of the screen display area of the display 201 may include at least one of audio modules 214, sensor modules 204, camera modules 205, a fingerprint sensor 216, and light-emitting elements 206. In another embodiment, the display 201 may be coupled to or disposed adjacent to a touch-sensitive circuit, a pressure sensor capable of measuring a touch intensity (pressure), and/or a digitizer configured to detect a magnetic field-type stylus pen. In some embodiments, at least some of the sensor modules 204 and 219 and/or at least some of the key input devices 217 may be disposed in the first areas 210D and/or the second areas 210E.

The audio modules 203, 207, and 214 may include a microphone hole 203 and speaker holes 207 and 214. The microphone hole 203 may include a microphone disposed therein to acquire external sound, and in some embodiments, a plurality of microphones may be disposed therein to be able to detect the direction of sound. The speaker hole 207 or 214 may include an external speaker hole 207 and a call receiver hole 214. In some embodiments, the speaker holes 207 and 214 and the microphone hole 203 may be implemented as a single hole, or a speaker (e.g., a piezo speaker) may be included without the speaker holes 207 and 214.

The sensor modules 204, 216, and 219 may generate electrical signals or data values corresponding to the internal operating state or the external environmental state of the electronic device 200. The sensor modules 204, 216, and 219 may include, for example, a first sensor module 204 (e.g., a proximity sensor), a second sensor module (e.g., a fingerprint sensor) disposed on the first surface 210A of the housing 210, a third sensor module 219 (e.g., a heart rate monitor (HRM) sensor), and/or a fourth sensor module 216 (e.g., a fingerprint sensor) disposed on the second surface 210B of the housing 210. The fingerprint sensor may be disposed not only on the first surface 210A (e.g., the display 201) of the housing 210, but also on the second surface 210B. The electronic device 200 may further include the sensor module 176 of FIG. 1, for example, at least one of a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, or an illuminance sensor.

The camera modules 205, 212, and 213 may include a first camera device 205 disposed on the first surface 210A of the electronic device 200, a second camera device 212 disposed on the second surface 210B thereof, and/or a flash 213. The camera devices 205 and 212 may include one or more lenses, an image sensor, and/or an image signal processor. The flash 213 may include, for example, a light-emitting diode or a xenon lamp. In some embodiments, two or more lenses (e.g., an infrared camera lens, a wide-angle lens, and a telephoto lens) and image sensors may be disposed on one surface of the electronic device 200.

The key input devices 217 may be disposed on the side surface 210C of the housing 210. In another embodiment, the electronic device 200 may not include some or all of the above-mentioned key input devices 217, and a key input device 217, which is not included in the electronic device 100, may be implemented in another form, such as a soft key, on the display 201. In some embodiments, the key input devices may include a sensor module 216 disposed on the second surface 210B of the housing 210.

The light-emitting elements 206 may be disposed, for example, on the first surface 210A of the housing 210. The light-emitting elements 206 may provide, for example, information about the state of the electronic device 200 in an optical form. In another embodiment, the light-emitting elements 206 may provide a light source that is interlocked with, for example, the operation of the camera module 205. The light-emitting elements 206 may include, for example, a light emitting diode (LED), an IR LED, and a xenon lamp.

The connector holes 208 and 209 may include a first connector hole 208, which is capable of accommodating a connector (e.g., a USB connector) for transmitting/receiving power and/or data to/from an external electronic device, and/or a second connector hole 209, which is capable of accommodating a connector (e.g., an earphone jack) for transmitting/receiving an audio signal to/from an external electronic device.

Figure 4:
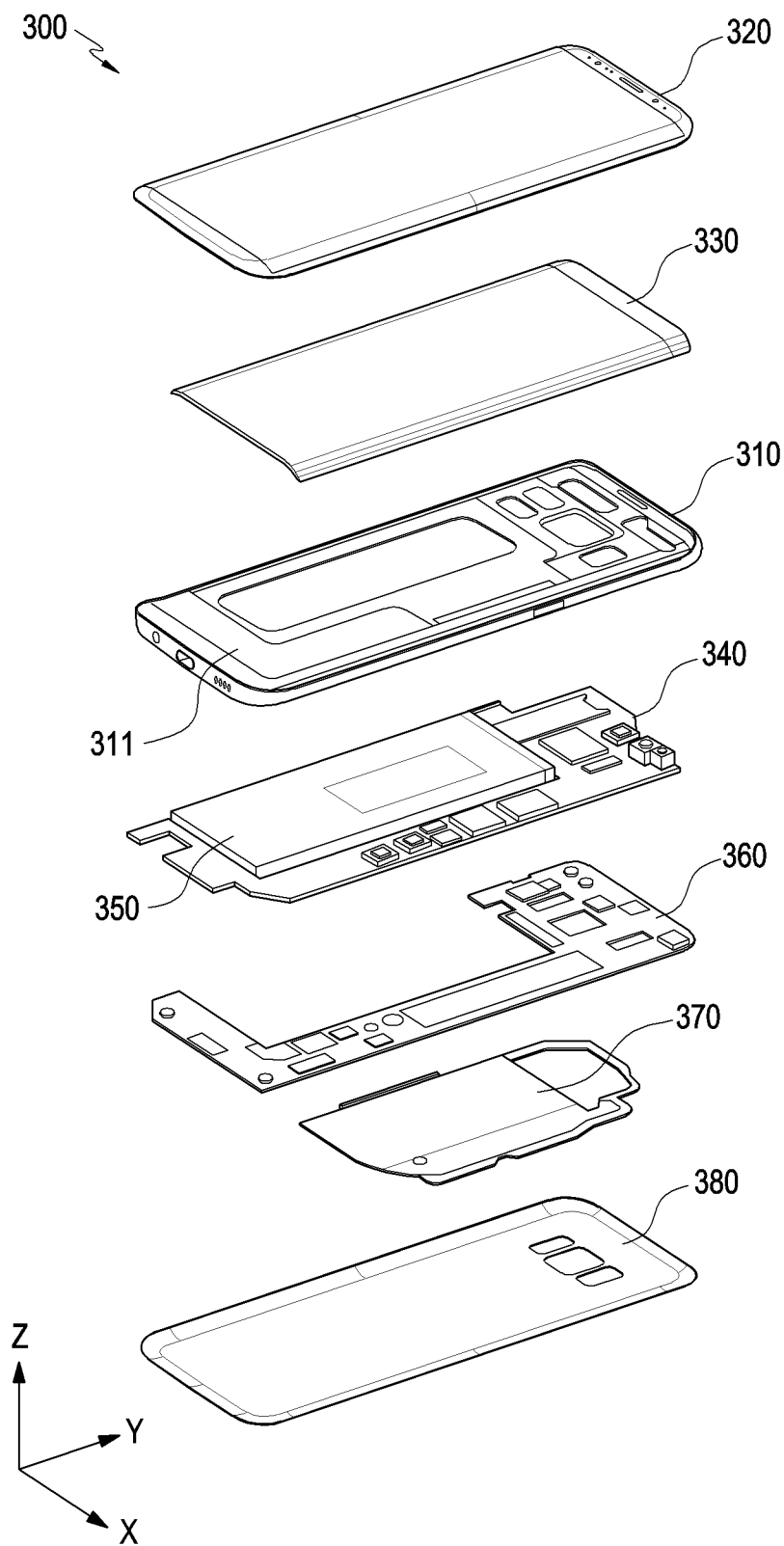
FIG. 4 is a diagram illustrating the electronic device illustrated in FIG. 2, according to various embodiments.

FIG. 4 is a diagram illustrating the electronic device illustrated in FIG. 2, according to various embodiments.

Referring to FIG. 4, the electronic device 300 may include a side structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, in the electronic device 300, at least one of the components (e.g., the first support member 311 or the second support member 360) may be omitted, or other components may be additionally included. At least one of the components of the electronic device 300 may be the same as or similar to at least one of the components of the electronic device 200 of FIG. 2 or FIG. 3, and redundant description thereof will be omitted below.

The first support member 311 may be disposed inside the electronic device 300, and may be connected to the side structure 310 or may be configured integrally with the side structure 310. The first support member 311 may be made of, for example, a metal material and/or a non-metal material (e.g., a polymer). The display 330 may be coupled to one surface of the first support member 311, and the printed circuit board 340 may be coupled to the other surface of the first support member 311. On the printed circuit board 340, a processor, a memory, and/or an interface may be mounted. The processor may include one or more of, for example, a central processing unit, an application processor, a graphics processor, an image signal processor, a sensor hub processor, or a communication processor.

The memory may include, for example, a volatile memory or a nonvolatile memory.

The interface may include, for example, an HDMI, a USB interface, an SD card interface, and/or an audio interface. The interface may electrically or physically connect, for example, the electronic device 300 to an external electronic device and may include a USB connector, an SD card/a multimedia card (MMC) connector, or an audio connector.

The battery 350 is a device for supplying power to at least one component of the electronic device 300, and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 300, or may be detachably disposed on the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 is capable of, for example, performing short-range communication with an external device or transmitting/receiving power required for charging to/from an external device in a wireless manner. In another embodiment, an antenna structure may be provided by a portion of the side structure 310, a portion of the first support member 311, or a combination thereof.

Figure 5:
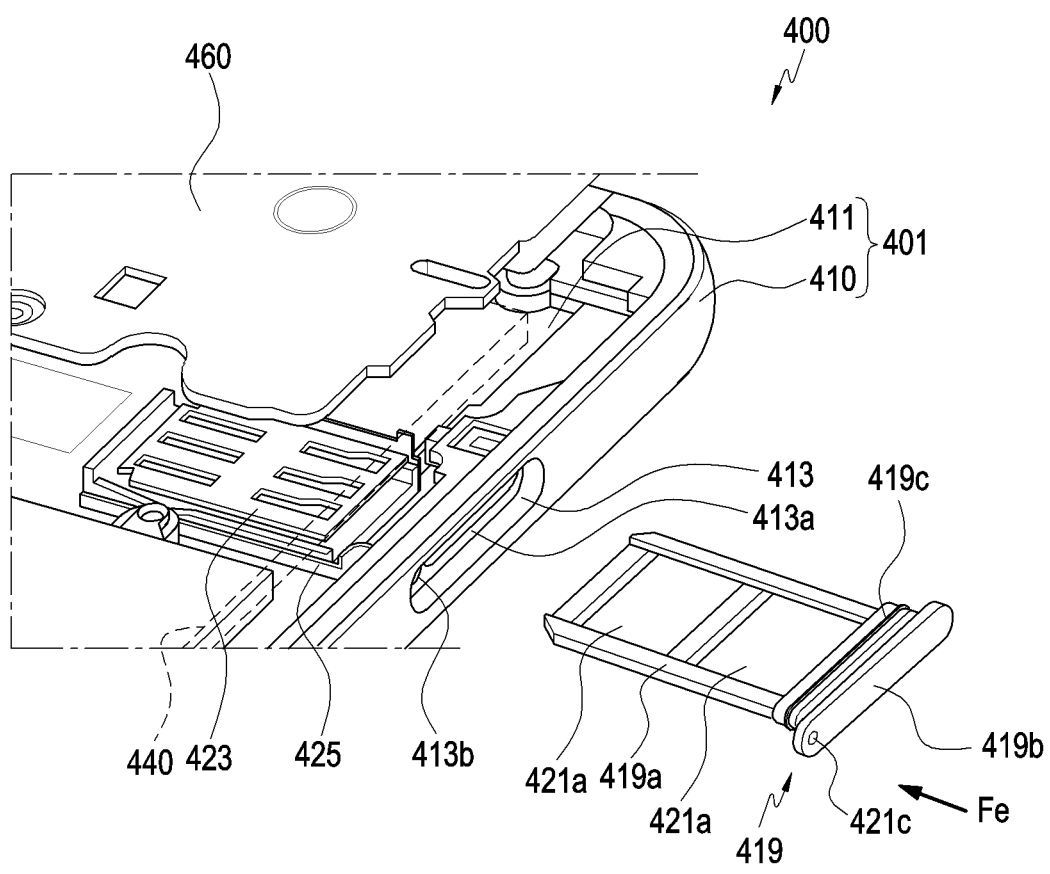
FIG. 5 is a diagram illustrating a portion of the electronic device according to various embodiments.

FIG. 5 is diagram illustrating an electronic device 400 (e.g., the electronic device 101, 102, 104, 200, or 300 in FIGS. 1 to 4) according to various embodiments.

Referring to FIG. 5, the electronic device 400 may include a housing 401 including a side structure 410 (e.g., the side structure 310 in FIG. 4) and a first support member 411 (e.g., the first support member 311 in FIG. 4), and a first opening 413a and a second opening 413b provided through the side wall (e.g., the side structure 410) of the housing 401. According to an embodiment, the housing 401 may include a second support member 460 (e.g., the second support member 360 in FIG. 4) coupled with the first support member 411 to face the same, and at least one circuit board 440 (e.g., the printed circuit board 340 in FIG. 4) may be disposed between the first support member 411 and the second support member 460.

According to various embodiments, the first support member 411 may be disposed between the front surface (e.g., the first surface 210A in FIG. 2) and the rear surface (e.g., the second surface 210B in FIG. 3) of the electronic device 400, and the side structure 410 may be disposed to at least partially surround the area or space in which the first support member 411 is disposed. For example, the housing 401 defines a space between the front and rear surfaces of the electronic device 400 to accommodate or protect electrical/electronic components such as a circuit board 440 or a battery (e.g., the battery 350 in FIG. 4). In an embodiment, when viewed in a plan view, the side structure 410 may have a closed curve or polygonal frame shape, and the first support member 411 may have a flat plate shape connected to the inside of the side structure 410.

According to various embodiments, it should be noted that the division of the side structure 410 and the first support member 411 is for convenience of description, and this division does not limit the various embodiments disclosed herein. It should be noted that, for example, the side structure 410 and the first support member 411 may be configured substantially integrally or partially omitted. In some embodiments, as described above, the first support member 411 or the second support member 460 may be omitted, and the shape of the housing 401 may be appropriately designed according to specifications required in an electronic device to be actually manufactured.

According to various embodiments, the first opening 413a may extend from the side wall of the housing 401, for example, the outer surface of the side structure 410 to the internal space of the housing 401 through at least a portion of the side structure 410. In some embodiments, the first opening 413a may further penetrate a portion of the first support member 411 from the outer surface of the side structure 410 to be connected to the internal space of the housing 401. In an embodiment, the first opening 413a may be utilized as a connector hole (e.g., the connector holes 208 and 209 in FIG. 2 or 3) or a sound hole for an audio module (e.g., the audio modules 203, 207, and 214 in FIG. 2), and the present embodiment may disclose an example in which the first opening 413a is provided as a connection hole for attaching/detaching a storage medium or a tray 419. The "storage medium" may include a memory card such as an SD card (e.g., the external memory 138 in FIG. 1) or a SIM card. In another embodiment, as will be described with reference to FIG. 6, when the first opening 413a is provided as a connection hole, the first opening 413a may be disposed adjacent to the connector hole 408 or the sound hole 403.

According to various embodiments, the second opening 413b may be disposed at one side of the first opening 413a and may extend from the outer surface of the side wall of the housing 401 (e.g., the side structure 410) to the internal space of the housing 401 through at least a portion of the side structure 410. In some embodiments, the second opening 413b may further penetrate a portion of the first support member 411 from the outer surface of the side structure 410 to be connected to the internal space of the housing 401. When the first opening 413a functions as a connection hole for the storage medium, an external force Fe for separating the storage medium or the tray 419 from the housing 401 may be provided through the second opening 413b. As will be described later, a waterproof member 405 (see FIG. 7) may be disposed in the second opening 413b, and the waterproof member 405 may separate or eject the tray 419 accommodated or mounted in the housing 401 while linearly reciprocating within the second opening 413b in response to an external force Fe.

According to various embodiments, when the first opening 413a is provided as a connection hole for a storage medium, the electronic device 400 may further include a tray 419 inserted into or extracted from the housing 401 through the first opening 413a and a socket 423 aligned with the first opening 413a. The tray 419 may include a receiving portion 419a inserted into the housing 401 through the first opening 413a and at least partially accommodated in the socket 423, and a head 419b provided at one end of the receiving portion 419a. The receiving portion 419a may have a frame shape providing at least one accommodating groove 421a, and the tray 419 may accommodate a memory card or a subscriber identification module card by using the accommodating groove 421a. For example, the receiving portion 419a may be provided as a structure for disposing the storage medium into the socket 423. The head 419b may define a portion of the external appearance of the electronic device 400 together with the side structure 410 while concealing the first opening 413a and/or the second opening 413b from the external appearance of the electronic device 400.

According to various embodiments, in the structure in which the waterproof member 405 is disposed in the second opening 413b, the tray 419 may include a second waterproof member 419c so that a waterproof structure can be implemented in the first opening 413a. Since the structure or shape of the second waterproof member 419c may be similar to the waterproof member 405 or the waterproof ring 453 to be described later, a detailed description thereof will be omitted. The second waterproof member 419c may be disposed on the periphery of the receiving portion 419a at a position adjacent to the head 419b, and seals the space between the space the outer peripheral surface of the head 419b and the inner wall of the first opening 413a. The waterproof member 405 (e.g., the waterproof ring 453 or the sealing portion 453b) or the second waterproof member 419c may come into contact or close contact with the inner walls of the openings 413a and 413b along closed loop trajectories. According to an embodiment, a plurality of closed loop trajectories may be provided depending on the number or shapes of waterproof members 405 and 419c.

According to various embodiments, the outer surface of the side structure 410 may further include a recessed portion 413 in which the head 419b is accommodated. For example, in the state in which the tray 419 is coupled to the housing 401, the head 419b may be accommodated in the recessed portion 413, and the outer surface of the head 419b may form a continuous flat surface or a continuous curved surface with the outer surface of the side structure 410. In an embodiment, in the structure in which the recessed portion 413 is provided on the outer surface of the side structure 410, the first opening 413a and/or the second opening 413b may extend from the bottom or inner wall of the recessed portion 413 and through the side structure 410 to be connected to the inside of the housing 401. For example, in the state in which the tray 419 is coupled to the housing 401, the first opening 413a and/or the second opening 413b may be substantially concealed by the head 419b. In some embodiments, in the structure in which an external force Fe acts through the second opening 413b, the head 419b may further include a tray hole 421c configured to be aligned with the second opening 413b. For example, when the tray 419 is coupled to the housing 401, the tray hole 421c may be disposed to correspond to the second opening 413b.

According to various embodiments, the socket 423 may be disposed on the circuit board 440 or may be electrically connected to the circuit board 440 via another electric wire (e.g., a flexible printed circuit board) in the state of being disposed adjacent to the circuit board 440. The socket 423 is disposed inside the housing 401 in the state in which the inlet thereof is aligned with the first opening 413a, and the tray 419 (e.g., the receiving portion 419a) may be inserted through the first opening 413a to be at least partially accommodated in the socket 423. In an embodiment, the electronic device 400 may further include a release structure (e.g., the release lever 425) disposed on one side of the socket 423. The release lever 425 may linearly reciprocate by an external force Fe applied through the second opening 413b, and the release lever 425 may eject the tray 419 accommodated in the socket 423 from the socket 423 or to the outside of the housing 401 by pivoting a pivot member. For example, one end of the release lever 425 may be aligned to at least partially face the second opening 413b or the waterproof member 405 of FIG. 7. The waterproof member 405 may transmit, to the release lever 425, the external force Fe applied through the tray hole 421c while providing a waterproof structure inside the second opening 413b.

In the following detailed description, reference may be made to the electronic devices 101, 102, 104, 200, and 300 of the preceding embodiments, and for components that can be easily understood through the preceding embodiments, the same reference numerals in the drawings may be given or reference numerals may be omitted, and a detailed description thereof may also be omitted.

Figure 6:
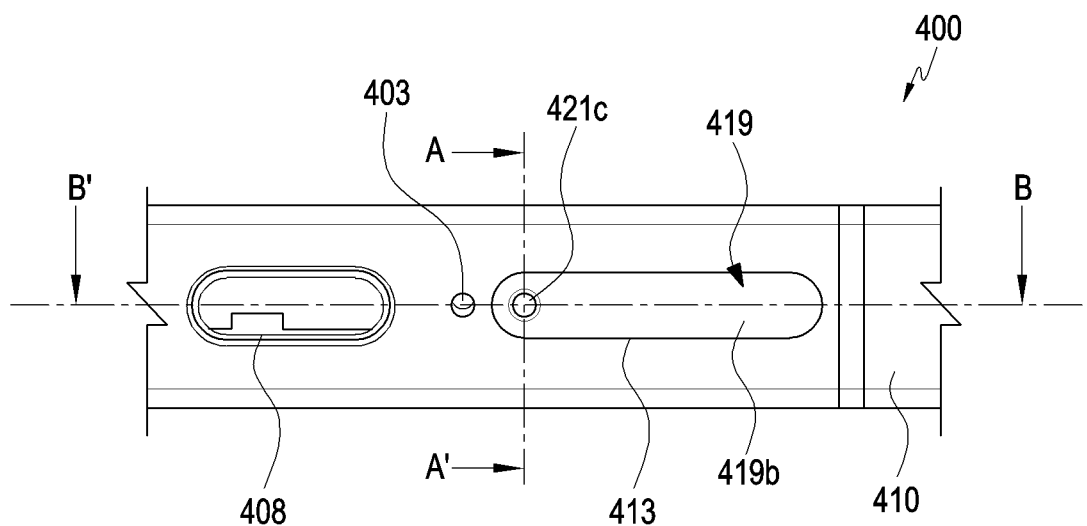
FIG. 6 is a diagram illustrating one side surface of an electronic device according to various embodiments.
Figure 7:
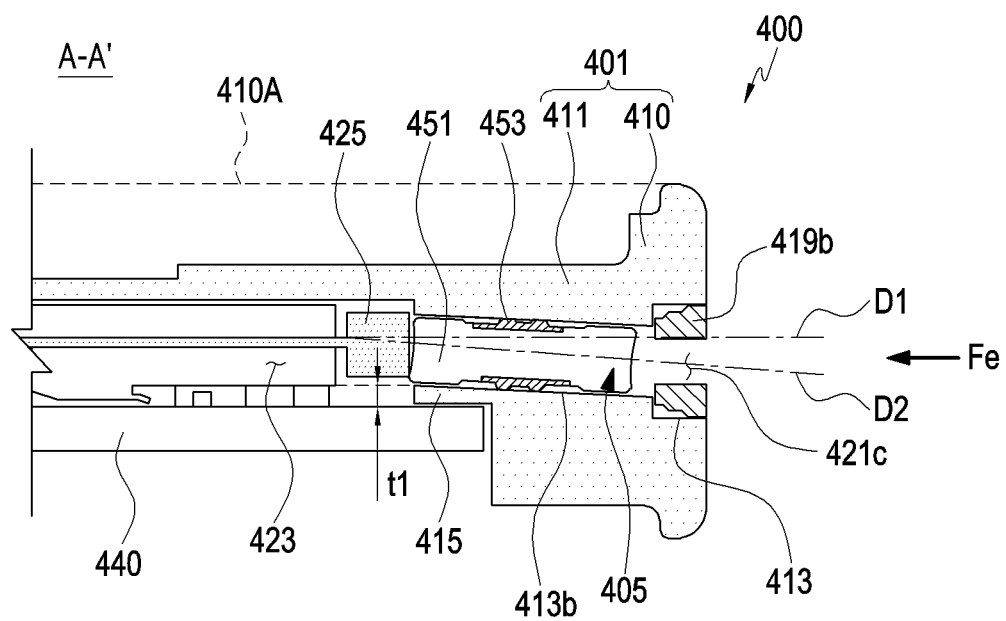
FIG. 7 is a diagram obtained by cutting a portion of the electronic device along line A-A' in FIG. 6 according to various embodiments.

FIG. 6 is a diagram illustrating one side surface of an electronic device (e.g., the electronic device 101, 102, 104, 200, 300, or 400 in FIGS. 1 to 5) according to various embodiments. FIG. 7 is a diagram obtained by cutting a portion of the electronic device 400 along line A-A' in FIG. 6, according to various embodiments.

Referring to FIGS. 6 and 7, in a side wall of the housing (e.g., the housing 401 in FIG. 5), for example, one side surface of the side structure 410 (e.g., any one of the side surfaces oriented in the X-axis or Y-axis direction in FIG. 2), a connector hole 408 (e.g., the connector hole 208 in FIG. 2), a sound hole 403 (e.g., the audio module 203 in FIG. 2), and/or a connection hole (e.g., the groove 413 or the openings 413a and 413b of FIG. 5) may be disposed. It should be noted that, in the illustrated embodiment, the openings 413a and 413b are not shown since the housing 401 or the side structure 410 is coupled to the tray 419. Although not illustrated in FIG. 6, the key input devices 217 of FIG. 2 or FIG. 3 may be disposed adjacent to the sound hole 403 or the groove 413. The above-mentioned holes 408, 403, and 413, the key input device 217 or the tray 419 (e.g., the head 419b) may have various shapes according to functions assigned thereto.

According to various embodiments, when disposed adjacent to each other on one side surface of the side structure 410, the above-mentioned holes 408, 403, and 413, the key input device 217, or the tray 419 are aligned on a predetermined line, which may alleviate or prevent deterioration of the external appearance of the electronic device (e.g., the electronic device 101, 102, 104, 200, 300, or 400 in FIGS. 1 to 5). For example, as illustrated in FIG. 6, the above-mentioned holes 408, 403, and 413 and/or tray 419 may be aligned on a straight line (e.g., line B-B'). In another embodiment, the above-mentioned holes 408, 403, and 413 and/or the tray 419 may be displaced from each other within a predetermined range rather than being aligned on a straight line. However, this may deteriorate the external appearance of the electronic device 400, or may increase the complexity of a process of forming or processing the holes 408, 403, and 413.

According to various embodiments, when viewed from a direction parallel to the first surface 410A (e.g., the first surface 210A in FIG. 2), the second opening 413b may extend to be inclined with respect to the direction in which the tray 419 is inserted into or extracted from the housing 401. In FIG. 7, "D1" illustrates the direction in which the tray 419 is inserted into or extracted from the housing 401 and which may be referred to as a "first direction" below, and "D2" illustrates the direction in which the second opening 413b extends or the waterproof member 405 linearly reciprocates which may be referred to as a "second direction" below. According to an embodiment, in consideration of the fact that the connector hole 408 and the sound hole 403 are processed together, the second opening 413b may be easily processed when the second direction D2 is parallel to or substantially coincident with the first direction D1. According to various embodiments disclosed herein, there may be a deviation between the position of the socket 423 inside the housing 401 (e.g., the position at which the tray 419 is accommodated) and the position at which the above-described holes 408, 403, and 413 are aligned in the external appearance of the electronic device 400. In some embodiments, in consideration of this deviation, when viewed in a direction parallel to the first surface 410A of the electronic device 400, the second direction D2 may be set to be inclined with respect to the first direction D1. Here, the "direction parallel to the first surface 410A" may refer to a direction parallel to the X-axis direction or the Y-axis direction in FIGS. 2 to 4 and perpendicular to the direction in which the tray 419 is inserted or extracted (e.g., the first direction D1).

According to various embodiments, the waterproof member 405 may be substantially accommodated inside the second opening 413b, and may be partially out of the second opening 413b to be located in the internal space of the housing since the waterproof member 405 linearly reciprocates in the second direction D2. According to an embodiment, the state illustrated in FIG. 7 is the state in which the tray 419 is coupled to the housing 401, so the tray head (e.g., the head 419b) may be substantially accommodated in the groove 413, and the waterproof member 405 may be accommodated inside the second opening 413b. In another embodiment, when an external force Fe is applied to the waterproof member 405 through the tray hole 421c, the waterproof member 405 may move the release lever 425 while moving to the inside of the housing 401 in response to the external force Fe.

According to various embodiments, the electronic device 400 and/or the housing 401 may further include a rib 415 to prevent the waterproof member 405 from being separated from the second opening 413b even when the waterproof member 405 linearly reciprocates. For example, when the rib 415 extends in the second direction D2 or the first direction D1 from the inner surface of the side wall (e.g., the side structure 410), the length of the second opening 413b may be sufficiently secured, and the waterproof member 405 may stably maintain the state of being substantially accommodated in the second opening 413b even when the waterproof member 405 partially moves into the internal space of the housing 401. In the embodiment illustrated in FIG. 7, the rib 415 has a shape extending from the inner surface of the side structure 410, but may be a portion of a structure that is disposed to substantially surround at least a portion of the second opening 413b or the waterproof member 405, i.e., a portion of the side structure 410 or the first support member 411.

According to various embodiments, the rib 415 may be at least partially disposed between the second opening 413b and the circuit board 440 inside the housing 401. For example, in the structure in which the socket 423 is disposed on the circuit board 440, in securing a sufficient length of the second opening 413b, the rib 415 may be disposed between the second opening 413b and the circuit board 440. According to an embodiment, when the second opening 413b extends to be parallel to the first direction D1 in the state of being aligned with other holes (e.g., the connector holes 408 or the sound hole 403) in the outer surface of the housing 401 (e.g., the side structure 410), the thickness t1 of the rib 415 may be less than that in the illustrated embodiment. According to various embodiments disclosed herein, when the second opening 413b is provided or extended to be inclined with respect to the direction in which the tray 419 is inserted or extracted (e.g., the first direction D1), the rib 415 may be configured to have a proper thickness t1, and the mechanical strength around the second opening 413b may be improved.

According to various embodiments, since the thickness t1 of the rib 415 is appropriately secured, a stable waterproof structure may be implemented. As will be described later, the waterproof member 405 may implement a waterproof structure by compression or close contact of the waterproof ring (e.g., the waterproof ring 453 or the sealing portion 453b in FIG. 8), and the waterproof ring 453 may come into contact with the inner wall (e.g., the inner wall of the second opening 413b) provided by the rib 415. For example, since the rib 415 is provided in an appropriate thickness t1 and has sufficient mechanical rigidity, it is possible to prevent the rib 415 from being deformed or damaged even when the waterproof ring 453 comes into close contact therewith in a compressed state. As described above, when the second opening 413b is provided to be inclined with respect to the direction in which the tray 419 is inserted or extracted, the rib 415 may contribute to implementing a stable waterproof structure while providing a sufficient section for the waterproof member 405 to linearly reciprocate. The configuration of the waterproof member 405 according to various embodiments will be further described with reference to FIGS. 8 and 9.

Figure 8:
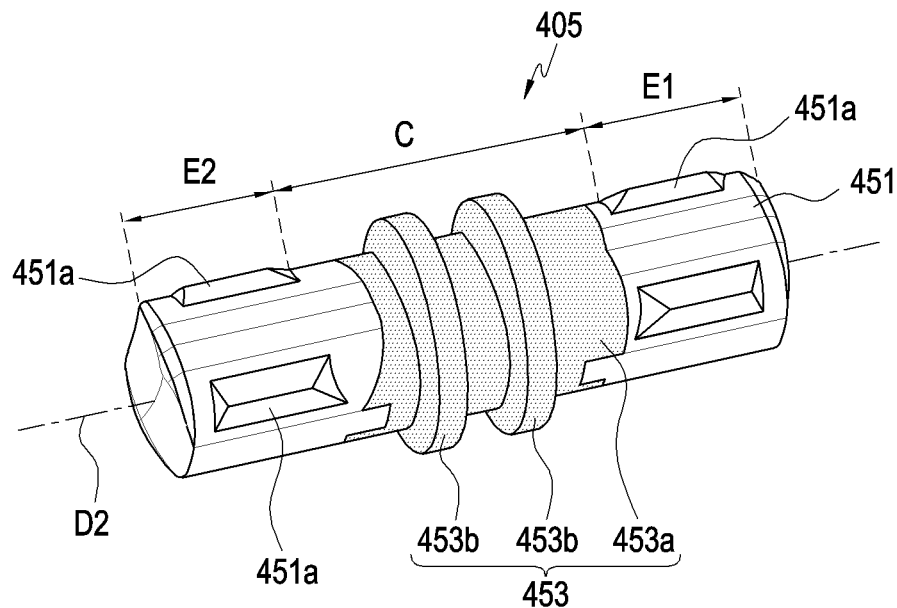
FIG. 8 is a diagram illustrating the waterproof member of the electronic device according to various embodiments.
Figure 9:
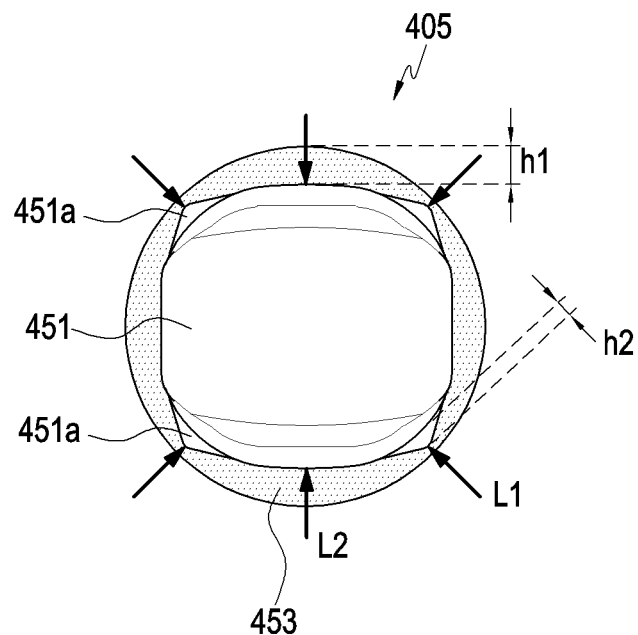
FIG. 9 is a diagram illustrating a waterproof member of the electronic device according to various embodiments.

FIG. 8 is a diagram illustrating the waterproof member 405 of the electronic device (e.g., the electronic device 101, 102, 104, 200, 300, or 400 in FIGS. 1 to 5) according to various embodiments. FIG. 9 is a diagram illustrating the waterproof member 405 of the electronic device 400 according to various embodiments.

Further referring to FIGS. 8 and 9 together with FIG. 7, the waterproof member 405 may include a pin member 451 and a waterproof ring 453. The pin member 451 may be formed of, for example, a synthetic resin material such as polycarbonate, and the waterproof ring 453 may be made of an elastic material such as rubber, silicone or urethane. According to an embodiment, the pin member 451 may be accommodated in the second opening 413b to linearly reciprocate in the second direction D2, and the waterproof ring 453 may protrude from the outer peripheral surface of the pin member 451 to seal the space or the gap between the outer peripheral surface of the pin member 451 and the inner wall of the second opening 413b.

According to various embodiments, the pin member 451 may include a central portion C on which the waterproof ring 453 is disposed, and working ends E1 and E2 located at opposite ends of the central portion C. In an embodiment, the central portion C may extend in one direction and may be at least partially accommodated or disposed within the second opening 413b. For example, in the section in which the waterproof member 405 linearly reciprocates, the central portion C may not substantially deviate from the second opening 413b. In some embodiments, when the waterproof member 405 is disposed within the second opening 413b, of the working ends E1 and E2, the first working end E1 may be disposed to be directed to the external space of the housing 401 and the second working end E2 may be disposed to be directed to the internal space of the housing 401. For example, an external force Fe may be substantially applied to the first working end E1 and transmitted to the release lever 425 via the pin member 451 (e.g., the second working end E2).

According to various embodiments, the waterproof member 405 (e.g., the pin member 451) may linearly reciprocate within the second opening 413b by an external force Fe. For example, when the tray 419 is inserted into the housing 401, a pivot member and the release lever 425 operate to move the pin member 451 toward the external space of the housing 401 within the second opening 413b. When an external force Fe is applied from the outside of the housing 401, the pin member 451 may operate the release lever 425 and the pivot member while moving into the inside of the housing 401. When the tray 419 is in the state of being coupled to the socket 423, the release lever 425 and/or the rotation member may separate the tray 419 from the socket 423 while operating or moving.

According to various embodiments, the electronic device 400 and/or the waterproof member 405 may include a plurality of support protrusions 451a provided on the pin member 451 (or the waterproof ring 453) at a position different from the waterproof ring 453 (e.g., the sealing portion 453b to be described later). The number of support protrusions 451a may vary according to embodiments, and at least three support protrusions 451a are arranged at equiangular intervals along the peripheral direction or the circumferential direction of the pin member 451 or the waterproof ring 453. The illustrated embodiment exemplifies a structure in which two pairs of support protrusions 451a protrude from the outer peripheral surface of the first working end E1, and two pairs of other support protrusions 451a protrude from the outer peripheral surface of the second working end E2.

According to various embodiments, the support protrusions 451a are provided so that the first working end E1 (or the second working end E2) may have a larger cross-sectional diameter or cross-sectional diagonal length L1 than the central portion C. For example, in FIG. 9, "L1" may refer to the cross-sectional diameter or the cross-sectional diagonal length of the first working end E1 (or the second working end E2), and "L2" may refer to the cross-sectional diameter or the cross-sectional diagonal length of the central portion C. Since the first working end E1 or the second working end E2 is able to reciprocate linearly within the second opening 413b, the cross-sectional diameter (or the cross-sectional diagonal length L1) of the first working end E1 or the second working end E2 may be less than the diameter (or the diagonal length) of the second opening 413b. In the present embodiment, although the "central portion C of the pin member 451" is referred to in describing the "cross-sectional diameter" or the "diagonal length", it should be noted that various embodiments disclosed herein are not limited thereto. For example, as illustrated in FIG. 8, in an embodiment in which a coupling portion 453a of the waterproof ring 453 surrounds at least a portion of the central portion C of the pin member 451, the "cross section of the central portion C" may mean that the cross-section of the coupling portion 453a is included. Although the present embodiment exemplifies the configuration in which the cross-sectional diameter or the cross-sectional diagonal length L1 is set since the waterproof member 405 includes the support protrusion(s) 451a, it should be noted that the various embodiments disclosed herein are not limited thereto. As will be described with reference to FIG. 15, the cross-sectional diameter L1 of the first working end E1 or the second working end E2 may be greater than the cross-sectional diameter L2 of the central portion C (or the coupling portion 453a). For example, in designing or manufacturing the cross-sectional diameter or the cross-sectional diagonal lengths L1 and L2 to be partially different from each other, whether the support protrusion(s) 451a is(are) further included or not may be appropriately selected in consideration of friction according to the linear reciprocation of the waterproof member 405 or ease of the manufacturing process.

According to various embodiments, the waterproof ring 453 may include, for example, a coupling portion 453a that is coupled to surround at least a portion of the outer peripheral surface of the pin member 451 (e.g., the central portion C), and at least one sealing portion 453b protruding from the outer peripheral surface of the coupling portion 453a, and the sealing portion 453b may provide a waterproof structure by being in close contact with the inner wall of the second opening 413b. In the illustrated embodiment, the structure in which the coupling portion 453a surrounding the outer peripheral surface of the pin member 451 is included in the waterproof ring 453 is exemplified, but the pin member 451 may have a structure in which the pin member 451 includes the shape of the coupling portion 453a. For example, the coupling portion 453a may be omitted from the waterproof ring 453, and the waterproof ring 453 may be an elastic body having the shape of the sealing portions 453b themselves (e.g., a closed loop shape such as an O-ring). In another embodiment, a plurality of waterproof rings 453 (e.g., the sealing portions 453b) may be disposed or arranged along the direction in which the pin member 451 extends (or the direction in which the pin member 451 linearly reciprocates). For example, an embodiment that implements a waterproof structure in which the coupling portions 453a are omitted from the illustrated embodiment and an O-ring is disposed at the position at which the sealing portion 453b is disposed may be disclosed. According to an embodiment, in the state of being accommodated in the second opening 413b, the sealing portion 453b may provide a stable waterproof structure by being compressed while being in close contact with or in contact with the inner wall of the second opening 413b along a closed loop trajectory. For example, before being accommodated in the second opening 413b, the diameter (e.g., the cross-sectional diameter) of the sealing portion 453b may be substantially greater than the diameter of the second opening 413b.

According to various embodiments, in forming a stable waterproof structure, the first height h1 of the sealing portion 453b protruding from the outer peripheral surface of the pin member 451 or the coupling portion 453a may be greater than the second height of the support protrusion(s) 451*a* protruding from the outer peripheral surface of the pin member 451 or the coupling portion 453*a*. For example, before being accommodated in the second opening 413*b*, the diameter or diagonal length of the cross section of the waterproof ring 453 (e.g., the sealing portions 453*b*) may be greater than the diameter or diagonal length L1 of the cross section of the working ends E1 and E2. Here, the "diameter or diagonal length L1 of the cross-section of the working ends E1 and E2" may refer to the diameter or diagonal length that passes through a position at which the support protrusion(s) 451*a* is(are) disposed. In another embodiment, in the state of being in close contact with the inner wall of the second opening 413*b* to be compressed after being accommodated in the second opening 413*b*, the diameter or diagonal length of the cross section of the waterproof ring 453 (e.g., the sealing portion 453*b*) may be greater than the diameter or diagonal length L1 of the cross sections of the working ends E1 and E2. For example, the diameter or diagonal length L1 of the cross-sections of the working ends E1 and E2 may be substantially less than the diameter or diagonal length of the second opening 413*b*, whereby the pin member 451 may linearly reciprocate smoothly within the second opening 413*b*, and the waterproof structure by the waterproof ring may be stably implemented.

According to various embodiments, an external force Fe for separating the tray 419 is a force applied by a user using a separation tool, and the user may intuitively apply the external force Fe in a direction parallel to the first surface 410A of the housing 401 (e.g., the first direction D1 that is a direction parallel to the tray 419 insertion direction). For example, the direction in which the waterproof member 405 linearly reciprocates (e.g., the second direction D2) and the direction in which the external force Fe acts (e.g., the first direction D1) may be inclined with respect to each other. In this case, a deviation in frictional force may occur depending on the contact position between the waterproof ring 453 (e.g., the sealing portion 453*b*) and the inner wall of the second opening 413*b*. In another embodiment, in the structure in which a plurality of waterproof rings 453 (e.g., seal portions 453) are disposed, the frictional force generated when the waterproof member 405 linearly reciprocates may vary depending on the positions of the waterproof rings 453.

Referring to FIG. 7, assuming a structure in which one waterproof ring 453 or sealing portion 453*b* is disposed, when an external force Fe is applied to the waterproof member 453, compared to the upper contact portion of the waterproof ring 453, the lower contact portion may be more compressed and may generate a greater frictional force. In another embodiment, assuming a structure in which a plurality of waterproof rings 453 are disposed, compared to the lower contact portion of the sealing portions 453*b* disposed inside the housing 401 (e.g., the left side in FIG. 7), the upper contact portion may generate a greater frictional force, and compared to the upper contact portion of the sealing portion 453*b* disposed outside of the housing 401 (e.g., the right side in FIG. 7), the lower contact portion may generate a greater frictional force. For example, in a structure in which the direction in which the second opening 413*b* extends or the linear reciprocating direction of the waterproof member 405 (e.g., the second direction D2) is set to be inclined with respect to the tray 419 insertion direction (e.g., the first direction D1) uneven wear may occur in the waterproof ring 453. The uneven wear of the waterproof ring 453 may cause deterioration of reliability or durability of the waterproof structure.

According to various embodiments, when the waterproof member 405 linearly reciprocates, at least one of the support protrusions 451*a* may selectively come into contact with the inner wall of the second opening 413*b* to alleviate or relieve the uneven wear of the waterproof ring 453. For example, the deviation in the frictional force partially generated in the linear reciprocating motion of the waterproof member 405 may occur since the waterproof member 405 is displaced to be inclined with respect to the direction in which the second opening 413*b* extends (e.g., the second direction D2). In some embodiments, as the difference between the diameter of the second opening 413*b* and the cross-sectional diameter (or diagonal length L1) of the pin member 451 increases, the inclined displacement of the waterproof member 405 with respect to the direction in which the second opening 413*b* extends may increase. According to various embodiments disclosed herein, since the waterproof member 405 includes the support protrusion(s) 451*a*, it is possible to reduce the difference between the diameter of the second opening 413*b* and the cross-sectional diameter (or diagonal length L1) of the pin member 451, and to suppress the inclined displacement of the waterproof member 405 with respect to the direction in which the second opening 413*b* extends. In some embodiments, by including the support protrusion(s) 451*a*, the waterproof member 405 may be disposed within the second opening 413*b* to be substantially parallel to or coincident with the direction in which the second opening 413*b* extends, and may suppress the deviation of frictional force in the linear reciprocating motion. Accordingly, it is possible to suppress deterioration in durability and reliability of the waterproof structure due to the deviation of frictional force.

Figure 10:
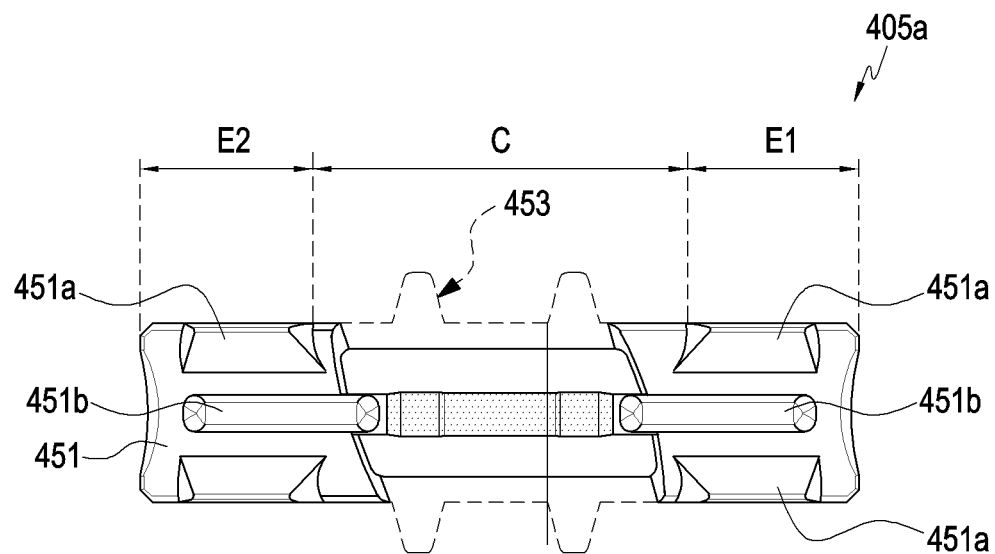
FIG. 10 is a diagram illustrating another example of the waterproof member of the electronic device according to various embodiments.
Figure 11:
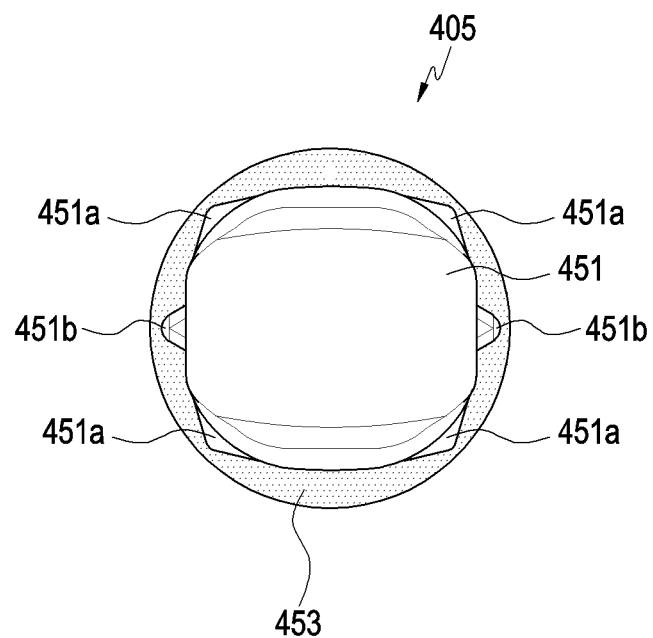
FIG. 11 is a diagram illustrating another example of the waterproof member of the electronic device according to various embodiments.

FIG. 10 is a diagram illustrating another example of a waterproof member 405*a* of an electronic device (e.g., the electronic device 101, 102, 104, 200, 300, or 400 in FIGS. 1 to 5) according to various embodiments. FIG. 11 is a diagram illustrating another example of the waterproof member 405*a* of the electronic device 400 according to various embodiments.

Referring to FIGS. 10 and 11, the waterproof member 405*a* may further include second support protrusion(s) 451*b* provided on the outer peripheral surface of the pin member 451. According to an embodiment, the second support protrusion(s) 451*b* may be disposed in a region between the above-mentioned support protrusions 451*a* in the peripheral direction or the circumferential direction of the pin member 451. In some embodiments, the second support protrusion(s) 451*b* may extend further than the above-mentioned support protrusion(s) 451*a* and may be partially located in the central portion C of the pin member 451. In another embodiment, the number and positions of support protrusions 451*a* or second support protrusions 451*b* may vary and may be appropriately selected in consideration of the specification and the manufacturing process of an electronic device to be manufactured (e.g., the electronic device 101, 102, 104, 200, 300, or 400 in FIGS. 1 to 5). In an embodiment, a diagonal length passing through the support protrusions disposed at symmetrical positions among the support protrusions 451*a* may be the same as a diagonal length passing through the second support protrusions 451*b*.

Figure 12:
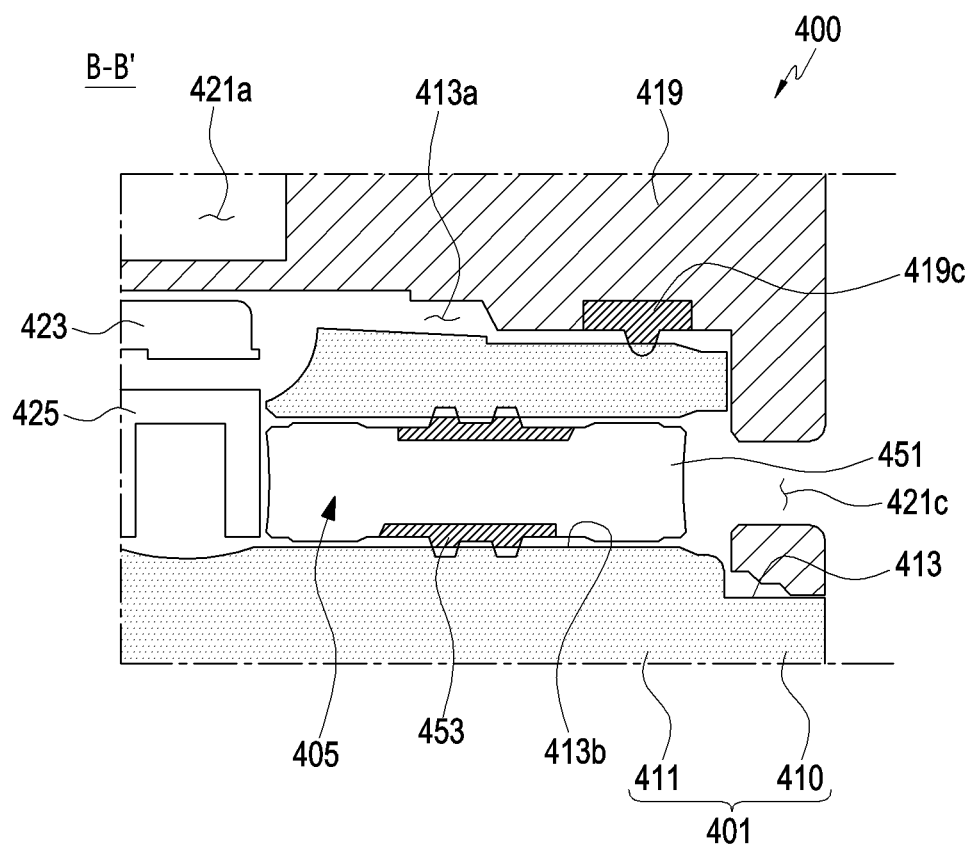
FIGS. 12, 13 and 14 are diagrams illustrating a portion of an electronic device by cutting it along line B-B' in FIG. 6, and sequentially illustrating the state in which the tray is separated from the housing according to various embodiments.
Figure 13:
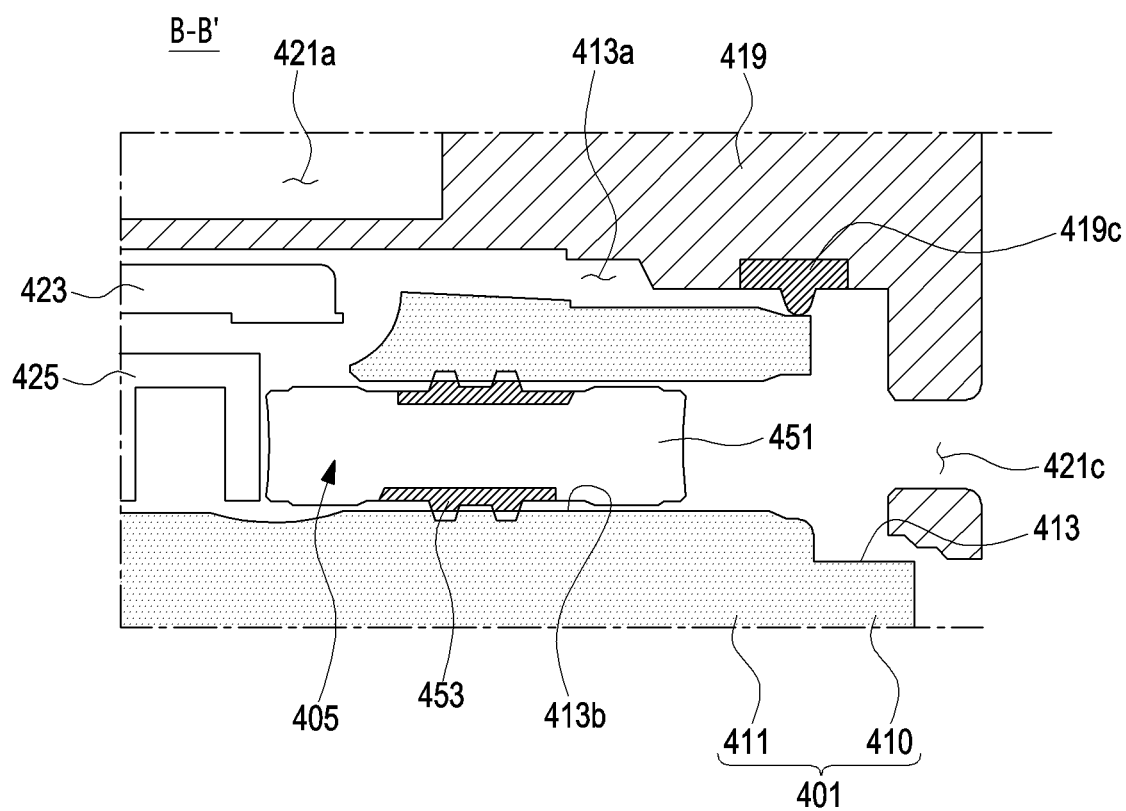
Figure 14:
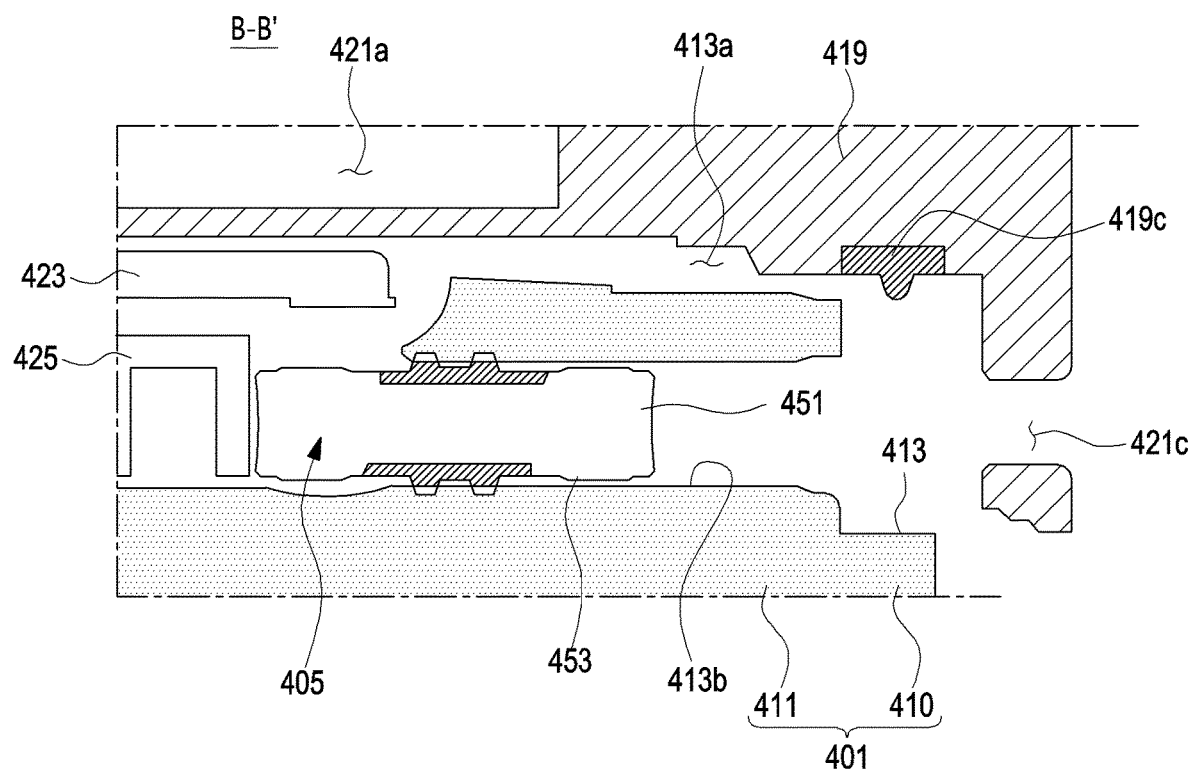

FIGS. 12, 13 and 14 are diagrams showing a portion of an electronic device (e.g., the electronic device 101, 102, 104, 200, 300, or 400 in FIGS. 1 to 5) taken along line B-B' of FIG. 6, in which the states in which the tray 419 is separated from the housing 401 are sequentially illustrated according to various embodiments.

In the above-described embodiments, the configuration in which the second opening 413b is inclined with respect to the direction in which the tray 419 is inserted has been described. In that description, an arrangement when viewed in a direction parallel to the first surface 410A as illustrated in FIG. 7 has been described. According to various embodiments, the cross-sectional views of FIGS. 12 to 14 substantially illustrate the states of the electronic device 400 when viewed from the front surface (e.g., the first surface 210A or 410A of FIG. 2 or FIG. 6) or the rear surface of the electronic device 400. When viewed from a direction different from FIG. 7, the direction in which the second opening 413b extends or the direction in which the waterproof member 405 linearly reciprocates may be substantially parallel to the direction in which the tray 419 is inserted.

Referring to FIG. 12, in the state in which the tray 419 is coupled to the socket 423, the waterproof member 405 is substantially located within the second opening 413b, and one end of the release lever 425 may be located adjacent to one end of the second opening 413b or the waterproof member 405 (e.g., the second working end E2 in FIG. 8). In the state in which the tray 419 is coupled to the socket 423, the waterproof member 405 (e.g., the sealing portion 453b) may come into close contact with the inner wall of the second opening 413b to be compressed while being accommodated in the second opening 413b, and the second waterproof member 419c may come into close contact with the inner wall of the first opening 413a to be compressed. As an external force (e.g., the external force Fe in FIG. 7) is applied through the tray hole 421c and/or the second opening 413b, the waterproof member 405 may gradually move to the inside of the housing 401 within the second opening 413b. For example, the second working end of the waterproof member 405 (e.g., the second working end E1 in FIG. 8) may gradually move away from the second opening 413b into the internal space of the housing 401.

Referring to FIG. 13, the waterproof member 405 may move the release lever 425 while moving to the inside of the housing 401, and the release lever 425 may gradually eject the tray 419 from the socket 423 or from the housing 401. According to an embodiment, in the state in which the tray 419 is coupled to the socket 423, the waterproof members 405 and 419c are in close contact with or are compressed against the inner walls of the openings 413a and 413b, so that it is possible to maintain the tray 401 in the state of being fixed to the housing 401. In another embodiment, while an external force Fe is applied, the waterproof members 405 and 419c may move while rubbing against the inner walls of the openings 413a and 413b. In some embodiments, one end of the first opening 413a may be connected to the bottom of the groove 413 while gradually increasing in width or length. For example, as the second waterproof member 419c approaches the groove portion 413, the frictional force generated between the second waterproof member 419c and the inner wall of the first opening 413a may decrease.

In various embodiments, it has been described above with reference to the embodiment of FIG. 7 that, when the waterproof member 405 moves to the inside of the housing 401 by the external force Fe, the moving direction of the waterproof member 405 may be inclined with respect to the direction in which the external force Fe acts. Although the inclined displacement of the waterproof member 405 within the second opening 413b may be caused by the inclination of the moving direction with respect to the direction in which the force acts, in the various embodiments disclosed herein, at least one of the support protrusions (e.g., the support protrusions 451a in FIG. 8) may come into contact with the inner wall of the second opening 413b, thereby suppressing the inclined displacement of the waterproof member 405. For example, the deviation in frictional force generated in different portions of the waterproof member 405 (e.g., at least the sealing portion 453b of the waterproof ring 453) may be suppressed, and a stable waterproof structure or durability of the waterproof structure may be secured.

Referring to FIG. 14, as the tray 419 gradually moves in the direction in which the tray 419 is ejected from the housing 401 by the action of the external force Fe, the second waterproof member 419c may be separated from the first opening 413a. For example, since the elastic force or frictional force due to the compressed state of the second waterproof member 419c does not act, the user may easily separate the tray 419 from the housing 401. According to an embodiment, the rib (e.g., the rib 415 in FIG. 7) extending from the inner wall of housing 401 (e.g., the inner surface of the side structure 410) may provide a sufficient length of the second opening 413b. For example, even when reaching the position for ejecting the tray 419 from the socket 423, the waterproof member 405 (e.g., at least the sealing portion 453b of the waterproof ring 453) may be substantially accommodated in the inside of the second opening 413b.

As such, in the electronic device (e.g., the electronic device 101, 102, 104, 200, 300, or 400 in FIGS. 1 to 5) according to various embodiments disclosed herein, since the second opening 413b extends to be inclined with respect to the direction in which the tray 419 is inserted (or extracted), on the external appearance of the electronic device 400, it may be easy to alien the second opening 413b or the tray hole 421c with other holes (e.g., the connector hole 408 or the sound hole 403 in FIG. 6). In another embodiment, since the second opening 413b extends to be inclined with respect to the direction in which the tray 419 is inserted (extracted), it is possible to sufficiently secure the thickness of a mechanical structure such as the rib 415. For example, the electronic device (e.g., the electronic device 101, 102, 104, 200, 300, or 400 of FIGS. 1 to 5) according to various embodiments disclosed herein may have mechanical stability or mechanical rigidity while having a beautiful external appearance. In an embodiment, since the rib 415 extends to the inside of the housing 401 from the inner surface of the side structure 410 to provide a sufficient length of the second opening 413b, the linear reciprocation of the waterproof member 405 may be stably implemented.

FIGS. 15, 16, 17, 18, 19 and 20 are diagrams illustrating various modifications of the waterproof member (e.g., the waterproof member 405 in FIG. 8) of an electronic device (e.g., the electronic device 101, 102, 104, 200, 300, or 400 in FIGS. 1 to 5) according to various embodiments disclosed herein.

Figure 15:
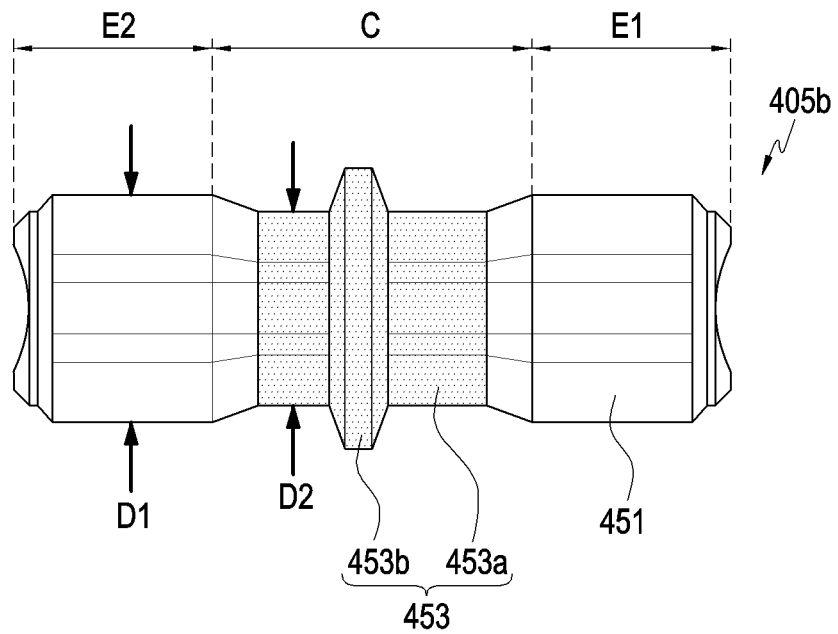
FIGS. 15, 16, 17, 18, 19 and 20 are diagrams illustrating various modifications of the waterproof member of the electronic device according to various embodiments.

Referring to FIG. 15, in the waterproof member 405b, the pin member 451 may have a substantially circular cross-sectional shape, and the cross-sectional diameter D1 of the first working end E1 or the second working end E2 may be greater than the cross-sectional diameter D2 of the central portion C. In some embodiments, the cross-sectional diameter D1 of the first working end D1 or the second working end D2 may be less than the cross-sectional diameter of the waterproof ring 453 (e.g., the sealing portion 453b) or the diameter of the second opening (e.g., the second opening 413b in FIG. 7 or FIG. 12). In an embodiment, when the cross section of the pin member 451 has a polygonal shape, the "cross-sectional diameters D1 and D2" referred to in the embodiment of FIG. 15 may refer to the diagonal length of a polygon. In another embodiment, the central portion C of the pin member 451 may be substantially surrounded by the coupling portion 453a of the waterproof ring 453. In this case, the "cross-sectional diameter D2 of the central portion C" may refer to including the thickness of the coupling portion 453a or may refer to the diameter of a cross section in which the pin member 451 and the coupling portion 453a are combined.

Figure 16:
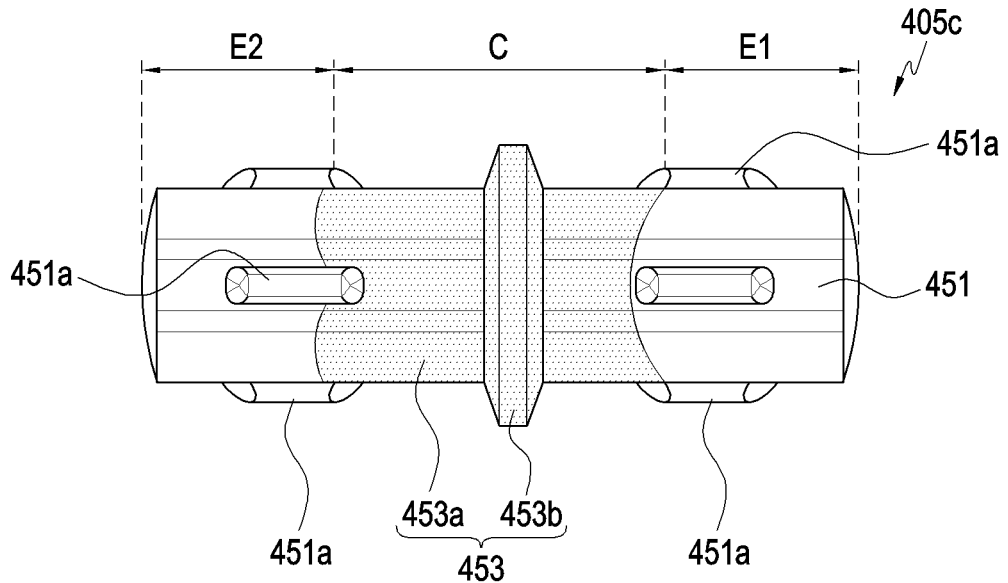

Referring to FIG. 16, the support protrusion(s) 451a of the waterproof member 405c may be disposed between the sealing portion 453b and the ends of the pin member 451. For example, the above-described embodiments illustrate a structure in which the support protrusions 451a extend substantially from positions adjacent to opposite ends of the pin member 451 in the direction in which the pin member 451 extends or the direction in which the waterproof member 405 reciprocates. However, as illustrated in FIG. 16, the support protrusions may extend from positions further away from the ends of the pin member 451 than those in the preceding embodiments. However, in an embodiment, the support protrusions 451a for suppressing the inclined displacement of the waterproof member 405 within the second opening 413b, and the farther the support protrusions are located from the waterproof ring 453 or the seal portion 453b, the more effectively, the inclined displacement of the waterproof member 450 can be effectively suppressed. In some embodiments, when the arrangement of the support protrusion(s) 451a of FIG. 16 and the arrangement of the support protrusion(s) 451a of FIG. 8 are combined, the deviation in the inclined displacement of the waterproof member 405 or in the frictional force generated in the waterproof member 405 may be more effectively suppressed.

Figure 17:
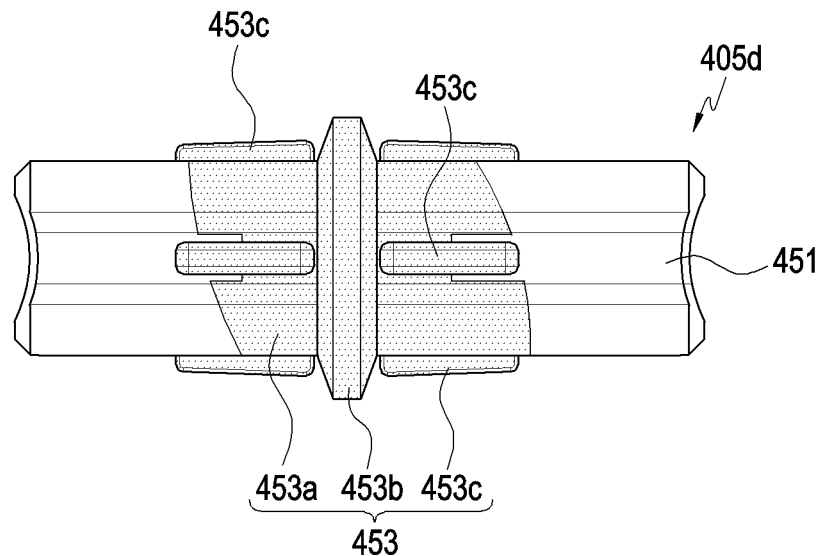
Figure 18:
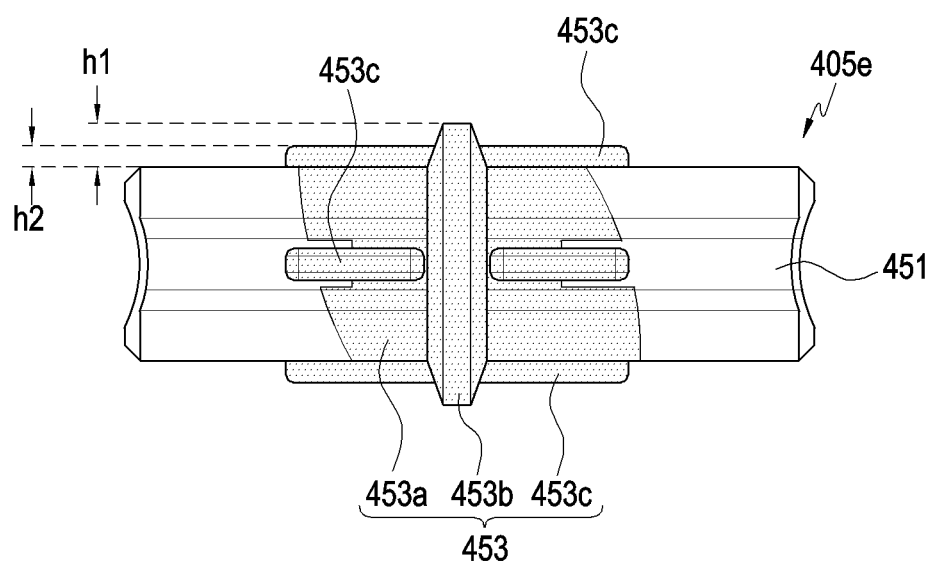

Referring to FIGS. 17 and 18, the waterproof member 405d or 405 may include support portion(s) 453c provided on the waterproof ring 453, and the support protrusion(s) 451a(s) of the above-described embodiment may be substituted with the support portion(s) 453c. For example, the support portion 453c protrudes from the surface of the coupling portion 453a, and may extend in a direction away from the sealing portion 453b in a state of being located adjacent to the sealing portion 453b (e.g., see FIG. 17) or substantially connected to the sealing portion 453b (e.g., see FIG. 18). In some embodiments, a plurality (e.g., two pairs) of support portions 453c may be arranged at equiangular intervals along the peripheral direction or the circumferential direction of the waterproof member 405d or 405e. In another embodiment, the plurality of support portions 453c may be arranged symmetrically with respect to the sealing portion 453b. For example, two pairs of support portions 453c (hereinafter, "first support portions") may be disposed on the right side of the sealing portion 453c and located inside the housing 401 within the second opening 413b, and the other two pairs of support portions 453c (hereinafter, "second support portions") may be disposed on the left side of the sealing portion 453c to be located outside the housing 401 within the second opening 413b. In some embodiments, the first support portions and the second support portions may be disposed or arranged symmetrically about the sealing portion 453b.

According to various embodiments, the first height h1 of the sealing portion 453b protruding from the outer peripheral surface of the pin member 451 or the outer peripheral surface of the coupling portions 453a may be greater than the second height h2 of the support portions 453c protruding from the outer peripheral surface of the pin member 451 or the outer peripheral surface of the coupling portions 453a.

For example, the sealing portion 453b may provide a stable waterproof structure by coming into close contact with the inner wall of the second opening 413b prior to the support portions 453c, and the support portions 453c may suppress the inclined displacement of the waterproof member 405d or 405e within the second opening 413b. In some embodiments, the waterproof member 405d or 405e may further include the support portions 453c of FIG. 17 or 18 while including the support protrusion(s) 451a of the above-described embodiment.

Figure 19:
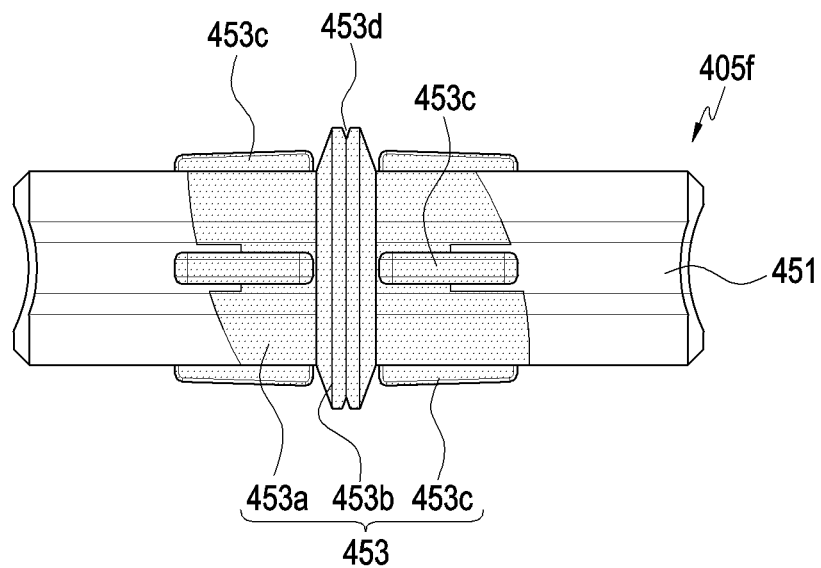

Referring to FIG. 19, the waterproof member 405f and/or the waterproof ring 453 may further include at least one dummy groove 453d. The dummy groove 453d may be provided, for example, along the peripheral direction or the circumferential direction of the pin member 451 at the upper end of the waterproof ring 453 (e.g., the sealing portion 453b). For example, in coming into contact with the inner wall of the second opening 413b, the waterproof ring 453 may come into contact with the inner wall of the second opening 413b from both sides of the dummy groove 453d, and the portion in which the waterproof ring 453 and the inner wall of the second opening 413b are in contact with each other may provide two closed loop trajectories. In some embodiments, a plurality of dummy grooves 453d may be provided in consideration of the width or area of the upper end of the waterproof ring 453 (e.g., the sealing portion 453b). In the illustrated embodiment, the waterproof ring 453 is exemplified in a configuration including the support portion(s) 453c protruding from the surface of the coupling portion 453a, but the various embodiments disclosed herein are not limited thereto, and the support portion(s) 453c may be substituted or combined with the support protrusion(s) 451a of FIG. 8 or FIG. 16.

Figure 20:
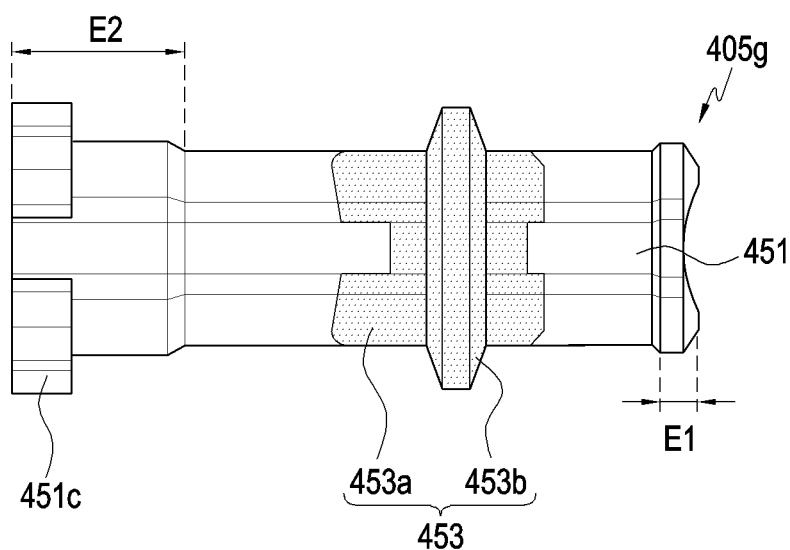

Referring to FIG. 20, the waterproof member 405g may further include a stopper 451c provided at one end of the pin member 451 (e.g., the second working end E2 in FIG. 8). The stopper 451c may be located inside the housing 401, for example, in the state in which the waterproof member 405g is disposed in the second opening 413b, and may come into selective contact with the inner surface of the side wall (e.g., the side structure 410 in FIG. 5) around the second opening 413b. For example, the stopper 451c may prevent the waterproof member 405g from being separated from the second opening 413b to the outside of the housing 401. In some embodiments, the stopper 451c may be provided on at least one of the waterproof members 405, 405a, 405b, 405c, 405d, 405e, and 405f of the preceding embodiments. For example, in consideration of at least one of implementing of a waterproof structure, suppressing of the inclined displacement of a waterproof member 405, 405a, 405b, 405c, 405d, 405e, 405f, or 405g, and preventing of the separation of the waterproof member 405, 405a, 405b, 405c, 405d, 405e, 405f, of 405g, the configurations of the above-described waterproof members 405, 405a, 405b, 405c, 405d, 405e, 405f, and 405g may be selectively combined to implement additional embodiments.

As described above, according to various embodiments disclosed herein, an electronic device (e.g., the electronic device 101, 102, 104, 200, 300, or 400 in FIGS. 1 to 5) may include a housing (e.g., the housing 401 in FIG. 5 or FIG. 7) including a first opening (e.g., the first opening 413a in FIG. 5 or FIG. 7) provided through the side wall thereof (e.g., the side structure 410 in FIG. 5) and a second opening (e.g., the second opening 413b in FIG. 5 or FIG. 7) provided through the side wall at one side of the first opening, a tray (e.g., the tray 419 in FIG. 5 or FIG. 7) configured to be inserted into or to be extracted from the housing through the first opening, and a waterproof member (e.g., the waterproof member 405 in FIG. 7 or FIG. 8) accommodated in the second opening and configured to reciprocate linearly. The waterproof member may include a pin member (e.g., the pin member 451 in FIG. 7 or FIG. 8) disposed to be capable of linearly reciprocating within the second opening, and at least one waterproof ring (e.g., the waterproof ring 453 in FIG. 7 or FIG. 8) configured to seal a space between the outer peripheral surface of the pin member and the inner wall of the second opening by protruding from the outer peripheral surface of the pin member. The second opening extends to be inclined with respect to a direction (e.g., the first direction D1 in FIG. 7) in which the tray is inserted or extracted.

According to various embodiment, the pin member may include a central portion (e.g., the central portion C in FIG. 8) extending in one direction and at least partially disposed within the second opening, the waterproof ring disposed on the outer peripheral surface of the central portion, and a first working end (e.g., the first working end E1 in FIG. 8 located at one end of the central portion and disposed within the second opening to be directed to an external space of the housing. The first working end may have a cross-sectional diameter or cross-sectional diagonal length greater than the central portion.

According to various embodiment, the plurality of waterproof rings may be sequentially disposed along a direction in which the central portion extends.

According to various embodiments, the pin member may further include a second working end (e.g., the second working end E2 in FIG. 8) located at the other end of the central portion, the second working end being disposed to be directed to an internal space of the housing, wherein the second working end may have a cross-sectional diameter or cross-sectional diagonal length greater than the central portion.

According to various embodiment, the pin member may further include at least three support protrusions (e.g., the support protrusions 451a in FIG. 8) protruding from the outer peripheral surface of the first working end, wherein the support protrusions may be arranged at equiangular intervals along a peripheral direction or a circumferential direction of the first working end.

According to various embodiment, the pin member may be configured to linearly reciprocate within the second opening in response to an external force (e.g., the external force Fe in FIG. 5 or FIG. 7), wherein at least one of the support protrusions may be configured to selectively come into contact with the inner wall of the second opening when the pin member linearly reciprocates.

According to various embodiments, the electronic device described above may further include a circuit board (e.g., the printed circuit board 340 in FIG. 4 or the circuit board 440 in FIG. 5) disposed inside the housing, and a rib (e.g., the rib 415 in FIG. 7) extending from an inner surface of the side wall to surround at least a portion of the second opening inside the housing, wherein the rib may be at least partially disposed between the circuit board and the second opening.

According to various embodiments, the thickness of the rib (e.g., thickness t1 in FIG. 7) may gradually decrease toward the exterior of the housing.

According to various embodiment, the electronic device described above may further include a socket (e.g., the socket 423 in FIG. 5 or FIG. 7) disposed on the circuit board and aligned with the first opening, and a release lever (e.g., the release lever 425 in FIG. 5 or FIG. 7) disposed at one side of the socket to be capable of linearly reciprocating and aligned with the second opening, wherein the tray may be at least partially accommodated in the socket within the housing and may be configured to move the release lever while the pin member linearly reciprocates within the second opening in response to an external force.

According to various embodiments, the pin member may include a central portion extending in one direction and at least partially disposed within the second opening, the waterproof ring disposed on the outer peripheral surface of the central portion, and a first working end located at one end of the central portion and disposed within the second opening to be directed to an external space of the housing, wherein the first working end may have a cross-sectional diameter or cross-sectional diagonal length greater than the central portion.

According to various embodiments, the pin member may further include at least three support protrusions protruding from the outer peripheral surface of the first working end, and the support protrusions may be arranged at equiangular intervals along a peripheral direction or a circumferential direction of the first working end.

According to various embodiments, the pin member may be configured to linearly reciprocate within the second opening in response to an external force, and at least one of the support protrusions may be configured to selectively come into contact with the inner wall of the second opening when the pin member linearly reciprocates.

According to various embodiments, the housing may include a first surface (e.g., the first surface 210A in FIG. 2) and a second surface (e.g., the second surface 210B in FIG. 3) facing away from the first surface, and the sidewall may be disposed to surround a space between the first surface and the second surface, wherein the second opening may be disposed to be parallel to the direction in which the tray is inserted or extracted when viewed from a direction perpendicular to the first surface (e.g., the Z-axis direction in FIGS. 2 to 4), and the second opening may be disposed to be inclined with respect to the direction in which the tray is inserted or extracted when viewed from a direction (e.g., the X-axis direction or Y-axis direction in FIGS. 2 to 4) parallel to the first surface.

According to various embodiments, the waterproof ring may include, at an upper end thereof, at least one dummy groove (e.g., the dummy groove 453d in FIG. 19) provided along a peripheral direction or a circumferential direction of the pin member, and the waterproof ring may be configured to come into contact with the inner wall of the second opening along at least two closed loop trajectories.

According to various embodiment, the waterproof member may further include a stopper (e.g., the stopper 451c in FIG. 20) provided at one end of the pin member and configured to come into selective contact with an inner surface of the side wall around the second opening.

According to various embodiments disclosed herein, an electronic device (e.g., the electronic device 101, 102, 104, 200, 300, or 400 of FIGS. 1 to 5) may include a housing (e.g., the housing 401 in FIG. 5 or FIG. 7) including a first opening (e.g., the first opening 413a in FIG. 5 or FIG. 7) provided through the side wall thereof (e.g., the side structure 410 in FIG. 5) and a second opening (e.g., the second opening 413b in FIG. 5 or FIG. 7) provided through the side wall at one side of the first opening, a tray (e.g., the tray 419 in FIG. 5 or FIG. 7) configured to be inserted into or to be extracted from the housing through the first opening, and a waterproof member (e.g., the waterproof member 405 in FIG. 7 or FIG. 8) accommodated in the second opening and configured to reciprocate linearly. The waterproof member may include a pin member (e.g., the pin member 451 in FIG.

7 or FIG. 8) disposed to be capable of linearly reciprocating within the second opening, and a waterproof ring (e.g., the waterproof ring 453 in FIG. 7 or FIG. 8) disposed on an outer peripheral surface of the pin member, the waterproof ring including a coupling portion (e.g., the coupling portion 453a in FIG. 8 or FIGS. 15 to 20) coupled to at least partially surround the outer peripheral surface of the pin member, at least one sealing portion (e.g., the sealing portion 453b in FIG. 8 or FIGS. 15 to 20) protruding from the outer peripheral surface of the coupling portion and configured to come into close contact with the inner wall of the second opening, and at least three support portions (e.g., the support portions 453c in FIGS. 17 to 19) protruding from the outer peripheral surface of the coupling portion and extending in a direction away from the sealing part. The sealing portion may be configured to seal a space between the outer peripheral surface of the pin member and the inner wall of the second opening, and the second opening may extend to be inclined with respect to a direction (e.g., the first direction D1 in FIG. 7) in which the tray is inserted or extracted.

According to various embodiments, the support portions may include at least three first support portions (e.g., the support portions 453c disposed at the right side of FIG. 17) disposed closer to the external space of the housing than the sealing portion, and at least three second support portions (e.g., the support portions disposed at the left side of FIG. 17) disposed closer to the internal space of the housing than the sealing portion.

According to various embodiment, the pin member may be configured to linearly reciprocate within the second opening in response to an external force (e.g., the external force Fe in FIG. 5 or FIG. 7), wherein at least one of the support portions may be configured to selectively come into contact with the inner wall of the second opening when the pin member linearly reciprocates.

According to various embodiments, the sealing portion may protrude from the outer peripheral surface of the coupling portion by a first height (e.g., the first height h1 in FIG. 18), and the support portions may protrude by a second height (e.g., the second height h2 in FIG. 18) lower than the first height.

According to various embodiments, the electronic device described above may further include a circuit board (e.g., the printed circuit board 340 in FIG. 4 or the circuit board 440 in FIG. 5) disposed inside the housing, and a rib (e.g., the rib 415 in FIG. 7) extending from an inner surface of the side wall to surround at least a portion of the second opening inside the housing, wherein the rib may be at least partially disposed between the circuit board and the second opening and may gradually decrease in thickness (the thickness t1 in FIG. 7) towards the exterior of the housing.

Although the disclosure has been described with reference to various embodiments as an example, it should be understood that the various embodiments are intended to be exemplary and are not limiting the disclosure. It will be apparent to those skilled in the art that various changes can be made in form and detail without departing from the overall scope of the disclosure, including the appended claims and equivalents to the same.

What is claimed is:

1. An electronic device comprising:
a housing comprising a side wall having a first opening and a second opening provided at one side of the first opening;
a tray configured to be inserted into or extracted from the housing through the first opening; and
a waterproof member provided in the second opening and configured to reciprocate linearly,
wherein the waterproof member comprises:
a pin member configured to linearly reciprocate within the second opening; and
at least one waterproof ring protruding from an outer peripheral surface of the pin member and sealing a space between the outer peripheral surface of the pin member and an inner wall of the second opening, and
wherein the second opening extends at an incline with respect to a direction in which the tray is inserted or extracted and, on an outer surface of the side wall, the second opening is aligned on a straight line with at least one of a connector hole, a sound hole, and a key input device.

2. The electronic device of claim 1, wherein the pin member comprises a central portion extending in one direction and at least partially disposed within the second opening, and a first working end located at a first end of the central portion and disposed within the second opening to be directed to an external space of the housing,
wherein the at least one waterproof ring is provided on an outer peripheral surface of the central portion, and
wherein the first working end has a cross-sectional diameter that is greater than a cross-sectional diameter of the central portion or has a cross-sectional diagonal length that is greater than a cross-sectional length of the central portion.

3. The electronic device of claim 2, wherein a plurality of waterproof rings are sequentially disposed along a direction in which the central portion extends.

4. The electronic device of claim 2, wherein the pin member further comprises a second working end located at a second end of the central portion, the second working end disposed in an internal space of the housing, and
wherein the second working end has a cross-sectional diameter that is greater than the cross-sectional diameter of the central portion or has a cross-sectional diagonal length that is greater than the cross-sectional diagonal length of the central portion.

5. The electronic device of claim 2, wherein the pin member further comprises at least three support protrusions protruding from an outer peripheral surface of the first working end, and
wherein the at least three support protrusions are provided at equiangular intervals along a peripheral direction of the first working end or a circumferential direction of the first working end.

6. The electronic device of claim 5, wherein the pin member is further configured to linearly reciprocate within the second opening in response to an external force applied thereto, and
wherein at least one of the at least three support protrusions is configured to selectively contact the inner wall of the second opening when the pin member linearly reciprocates.

7. The electronic device of claim 1, further comprising:
a circuit board disposed in the housing; and
a rib extending from an inner surface of the side wall and surrounding at least a portion of the second opening inside the housing,
wherein the rib is at least partially disposed between the circuit board and the second opening.

8. The electronic device of claim 7, wherein a thickness of the rib gradually decreases toward an exterior of the housing.

9. The electronic device of claim 7, further comprising:
a socket provided on the circuit board and aligned with the first opening; and
a release lever provided on one side of the socket, the release lever being configured to linearly reciprocate and aligned with the second opening,
wherein the tray is at least partially accommodated in the socket within the housing, and
wherein the pin member is configured to linearly move the release lever while linearly reciprocating within the second opening in response to an external force applied thereto.

10. The electronic device of claim 7, wherein the pin member further comprises a central portion extending in one direction and at least partially disposed within the second opening, and a first working end located at a first end of the central portion and disposed within the second opening to be directed to an external space of the housing,
wherein the at least one waterproof ring is provided on an outer peripheral surface of the central portion, and
wherein the first working end has a cross-sectional diameter that is greater than a cross-sectional diameter of the central portion or has cross-sectional diagonal length that is greater than a cross-sectional length of the central portion.

11. The electronic device of claim 10, wherein the pin member further comprises at least three support protrusions protruding from the outer peripheral surface of the first working end, and
wherein the at least three support protrusions are provided at equiangular intervals along a peripheral direction of the first working end or a circumferential direction of the first working end.

12. The electronic device of claim 11, wherein the pin member is further configured to linearly reciprocate within the second opening in response to an external force, and
wherein at least one of the at least three support protrusions is configured to selectively contact the inner wall of the second opening when the pin member linearly reciprocates.

13. The electronic device of claim 1, wherein the housing comprises a first surface and a second surface facing away from the first surface,
wherein the side wall surrounds a space between the first surface and the second surface,
wherein the second opening is parallel to the direction in which the tray is inserted or extracted when viewed from a direction perpendicular to the first surface, and
wherein the second opening is inclined with respect to the direction in which the tray is inserted or extracted when viewed from a direction parallel to the first surface.

14. The electronic device of claim 1, wherein the at least one waterproof ring comprises, at an upper end thereof, at least one dummy groove provided along a peripheral direction of the pin member or a circumferential direction of the pin member, and
wherein the at least one waterproof ring is configured to contact the inner wall of the second opening along at least two closed loop trajectories.

15. The electronic device of claim 1, wherein the waterproof member further comprises a stopper provided at one end of the pin member and configured to selectively contact an inner surface of the side wall around the second opening.

16. An electronic device comprising:
a housing comprising a side wall having a first opening and a second opening at one side of the first opening;
a tray configured to be inserted into or extracted from the housing through the first opening; and
a waterproof member provided in the second opening and configured to reciprocate linearly,
wherein the waterproof member comprises:
a pin member configured to linearly reciprocate within the second opening; and
a waterproof ring provided on an outer peripheral surface of the pin member, the waterproof ring comprising:
a coupling portion at least partially surrounding the outer peripheral surface of the pin member,
at least one sealing portion protruding from an outer peripheral surface of the coupling portion and contacting an inner wall of the second opening, and
at least three support portions protruding from the outer peripheral surface of the coupling portion and extending in a direction away from the at least one sealing portion,
wherein the at least one sealing portion is configured to seal a space between the outer peripheral surface of the pin member and the inner wall of the second opening, and
wherein the second opening extends at an incline with respect to a direction in which the tray is inserted or extracted and, on an outer surface of the side wall, the second opening is aligned on a straight line with at least one of a connector hole, a sound hole, and a key input device.

17. The electronic device of claim 16, wherein the at least three support portions comprise:
at least three first support portions provided closer to an external space of the housing than the at least one sealing portion; and
at least three second support portions provided closer to an internal space of the housing than the at least one sealing portion.

18. The electronic device of claim 16, wherein the pin member is further configured to linearly reciprocate within the second opening in response to an external force, and
wherein at least one of the at least three support portions is configured to selectively contact the inner wall of the second opening when the pin member linearly reciprocates.

19. The electronic device of claim 16, wherein the at least one sealing portion protrudes from the outer peripheral surface of the coupling portion by a first height, and
wherein the at least three support portions protrude by a second height that is lower than the first height.

20. The electronic device of claim 16, further comprising:
a circuit board provided in the housing; and
a rib extending from an inner surface of the side wall and surrounding at least a portion of the second opening inside the housing,
wherein the rib is at least partially disposed between the circuit board and the second opening and has a thickness that gradually decreases towards an exterior of the housing.

* * * * *